(12) United States Patent
Mizumori et al.

(10) Patent No.: US 8,196,054 B2
(45) Date of Patent: Jun. 5, 2012

(54) ON-SITE SYSTEM BUILDING SUPPORT TOOL

(75) Inventors: Takashi Mizumori, Kasama (JP);
Yoshihiko Takishita, Ishioka (JP);
Takami Kusaki, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 384 days.

(21) Appl. No.: 12/598,864

(22) PCT Filed: Mar. 24, 2008

(86) PCT No.: PCT/JP2008/055467
§ 371 (c)(1),
(2), (4) Date: Nov. 4, 2009

(87) PCT Pub. No.: WO2008/142907
PCT Pub. Date: Nov. 27, 2008

(65) Prior Publication Data
US 2010/0138758 A1 Jun. 3, 2010

(30) Foreign Application Priority Data
May 21, 2007 (JP) .................................. 2007-133733

(51) Int. Cl.
*G06F 3/048* (2006.01)
*G06G 7/48* (2006.01)
(52) U.S. Cl. ............. 715/763; 715/764; 715/771; 703/6
(58) Field of Classification Search .......... 715/762–765, 715/770, 771, 810; 703/6
See application file for complete search history.

(56) References Cited

U.S. PATENT DOCUMENTS

| 5,987,503 A * | 11/1999 | Murakami ................... 709/204 |
| 6,178,393 B1 * | 1/2001 | Irvin .............................. 703/10 |
| 2003/0051631 A1 * | 3/2003 | Ring ............................. 105/1.5 |
| 2003/0074391 A1 * | 4/2003 | Carter et al. ................. 709/200 |
| 2007/0184546 A1 * | 8/2007 | Farrelly et al. ............. 435/286.3 |

FOREIGN PATENT DOCUMENTS

| JP | 7-56994 A | 3/1995 |
| JP | 10-222572 A | 8/1998 |
| JP | 2005-31743 A | 2/2005 |
| WO | 01/55924 A1 | 8/2001 |

OTHER PUBLICATIONS

N. Nihongi et al., "Gyomu Bunseki Tool no Tekiyo Hyoka", Experiment on Business Process Analysis, IEICE Technical Report, vol. 94, No. 61, May 25, 1994, p. 83.

* cited by examiner

*Primary Examiner* — Tadeese Hailu
(74) *Attorney, Agent, or Firm* — Mattingly & Malur, PC

(57) ABSTRACT

An on-site system building support tool for assisting a user in building an on-site system by displaying a layout creation screen having an icon area for displaying icons, each of which represents any of various kinds of machines that can be used, and a canvas area in which a virtual system is built. The icons are displayed in the canvas area and connected to each other through an association line. A model setting screen is used to display the icons, and on the basis of setting conditions displayed on the model setting screen, a load on the virtual system built on the canvas area is calculated and displayed which applies to the environment. This enables checking of an environmental load on the basis of various kinds of conditions of the site.

9 Claims, 35 Drawing Sheets

FIG.14

The Total Amount of Work: 20000 (m³)

| | | Selected Model | The Number of Machines (Set) | Operating Time (h) | Travel Distance (km) |
|---|---|---|---|---|---|
| Digging | Hydraulic Shovel for Excavating | aa·aa | 1 | 140 | 0 |
| | Hydraulic Shovel for Traveling in a Site | bb·bb | 3 | 140 | 0 |
| | Transportation Trailer | 20t Trailer | 1 | 3 | 100 |
| | | 30t Trailer | 1 | 3 | 100 |
| | | 40t Trailer | 1 | 3 | 100 |
| | Truck for Field Operation | 10t Dump Truck | 5 | 140 | 3 |
| Transportation | Truck for Field Operation | 10t Dump Truck | 10 | 144 | 3 |
| | Transportation to a Disposal Site | 20t Dump Truck | 10 | 3 | 20 |
| Sorting | Screener (Size Screening) | cc·cc | 1 | 144 | 0 |
| | Screener (Particle-size Sorting) | dd·dd | 1 | 144 | 0 |
| Soil-quality Improvement | Soil-quality Improving Machine | ee·ee | 1 | 144 | 0 |
| Crushing | Crushing Machine | ff·ff | 1 | 144 | 0 |

Calculate the Amount of $CO_2$ Emission — 165

Return to the Process Screen — 170

Result of Calculating                    Return to the Process Screen

190

Costs

Unit: k¥

| Excavating | Transportation | Sorting | Soil-quality Improvement | Crushing | Disposal Cost | Total (Excluding Rental Fee) | Total (Including Rental Fee) |
|---|---|---|---|---|---|---|---|
| 1,094 | 9 | 266 | 223 | 302 | 266,666,667 | 266,668,551 | |

The Amount of $CO_2$ Emission

| Excavating | Transportation | Sorting | Soil-quality Improvement | Crushing | Disposal Cost | Total (Excluding Rental Fee) | Total (Including Rental Fee) |
|---|---|---|---|---|---|---|---|
| 33.3 | 0.3 | 8.1 | 6.8 | 9.2 | Unset | 57.7 | |

170

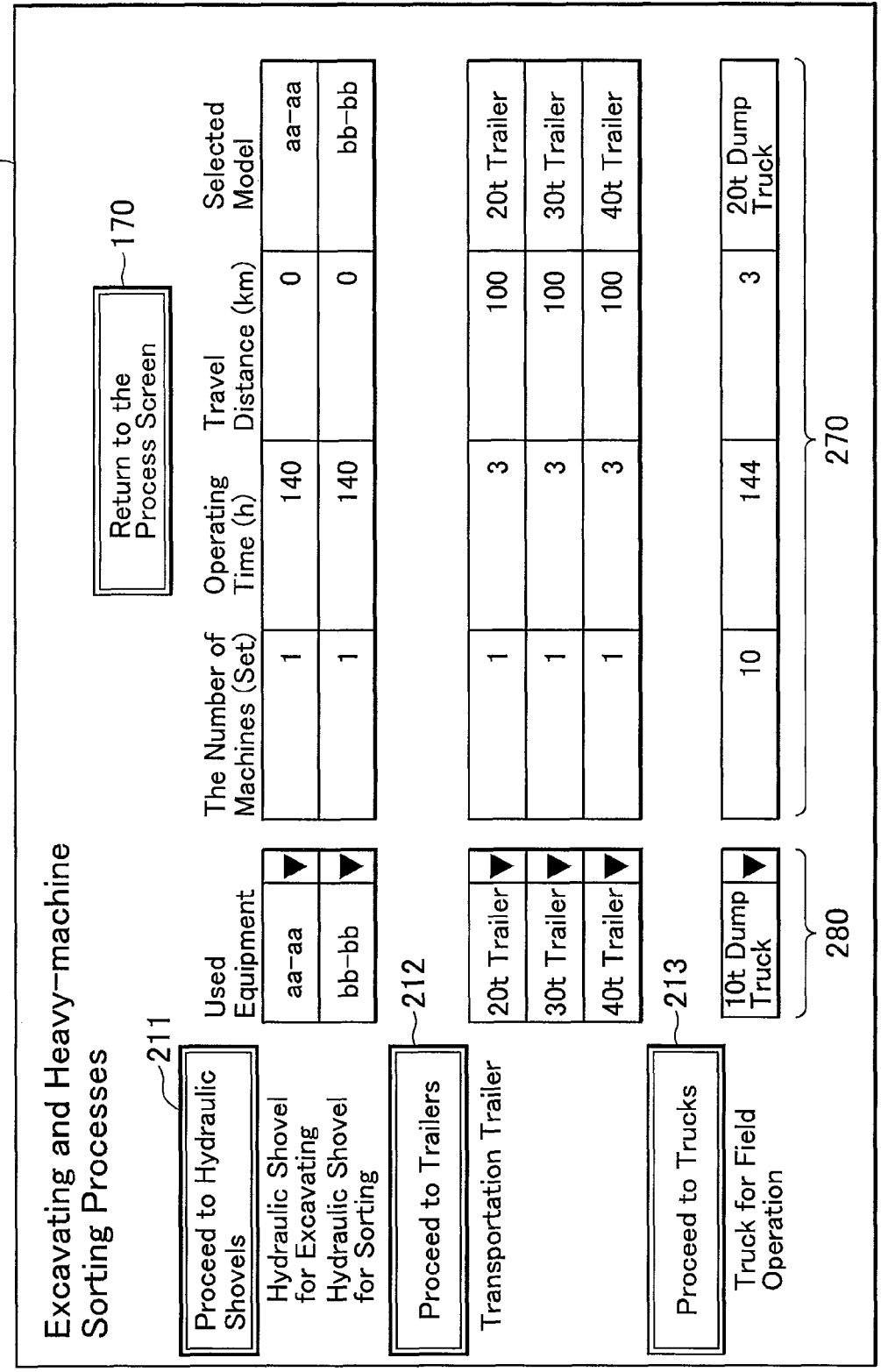

FIG.17

Transportation Process — 220

Proceed to Trucks — 221

Return to the Process Screen — 170

| | Used Equipment | The Number of Machines (Set) | Operating Time (h) | Travel Distance (km) | Selected Model |
|---|---|---|---|---|---|
| Truck for Field Operation | ▶ 10t Dump Truck | 10 | 144 | 3 | 10t Dump Truck |
| Transportation to a Disposal Site | ▶ 10t Dump Truck | 10 | 3 | 20 | 10t Dump Truck |

| | Volume (%) | Volume (m³) | The Number of 10t Dump Trucks | Bulk Specific Gravity | Mass (t) | Remarks |
|---|---|---|---|---|---|---|
| Surplus Soil | | 18,500 | 3053 | 1.5 | 27,750 | |
| Unslaked Lime | 3 | 555 | | 1.0 | 555 | Add X% Unslaked Lime at Volume (%) |
| Siol | 52.0 | 10,175 | 1680 | 1.5 | 15,263 | Add Y% Unslaked Lime at Volume (%) |
| Plastic | 4.5 | 833 | 138 | 0.2 | 167 | |
| Wood | 1.9 | 352 | 59 | 0.2 | 70 | |
| Iron Scraps | 1.1 | 204 | 34 | 1.5 | 3.5 | |
| Roadbed Material | 20.25 | 3,746 | 619 | 1.6 | 5,994 | A% of Z% |
| Backfill Material | 20.25 | 3,746 | 619 | 1.6 | 5,994 | A% of Z% |
| | | | 3149 (The Total Number of Dump Trucks) | | | |

| Load Capacity of 10t Dump Truck | 6.06 | m³ |
|---|---|---|

Input Value
Calculated Value

Return — 390

Return —390

Dump Truck (Manufactured by H Company) —420

| Load | Size of Truck Bed | | | Volume (m³) | Bulk Specific Gravity | Loadable Mass (t) | Remarks |
|---|---|---|---|---|---|---|---|
| | Length (m) | Width (m) | Height (m) | | | | |
| Standard | 5.3 | 2.2 | 0.52 | 6.06 | 1.65 | 10 | |
| Iron | | | | 6.06 | | 10 | Load Having a Weight of 10 ton or More Can be Carried from the Viewpoint of the Volume. |
| Reinforced Concrete | | | | 6.06 | 1.45 | 8.79 | |
| Crushed Concrete | | | | 60.6 | 1.45 | 8.79 | |

Load is Stacked Flat.

FIG.30

| Model | Engine | Output kW | NOx g/kWh | Fuel Consumption Rate L/kWh | Fuel Consumption L/h |
|---|---|---|---|---|---|
| ff-ff | abc-abc | 132 | 8.0 | 0.185 | 24.4 |
| dd-dd | ag-ggh | 20.6 | 8.0 | 0.170 | 3.5 |
| cc-cc | ah-jyu | 82.8 | | 0.217 | 18.0 |
| aa-aa | kwd-11jb | 184 | 6.0 | 0.175 | 32.2 |
| bb-bb | kwd-11jb | 110 | 6.0 | 0.175 | 19.3 |
| hh-hh | jha-11u | 129 | 6.0 | 0.153 | 19.7 |
| 40t Trailer | ktnrtk-kno1 | 177 | 3.38 | 0.075 | 13.3 |
| 30t Trailer | ktnrtk-kno2 | 177 | 3.38 | 0.075 | 13.3 |
| 20t Trailer | ktnrtk-kno2 | 140 | 3.38 | 0.075 | 10.5 |
| 10t Self-loader | myah-111k | 272 | 4.30 | 0.050 | 13.6 |
| 10t Dump Truck | khkn-kh1 | 272 | 3.21 | 0.050 | 13.6 |
| 10t Truck Crane | | 107 | | 0.044 | 4.7 |
| Electric Generator | 15kVA | 12.2 | | 0.238 | 2.9 |
| Power Generation | | | 0.12 | | |

Return

FIG.31

[Return] —390

Workload of Hydraulic Shovel (bb-bb)
$V=3,600 \times Q \times K \times E / (C \times D)$

| V | 99.8 | :Workload Per Unit Time (m3/h) |
| Q | 0.8 | :Bucket Capacity (Pile Up) (m3) |
| K | 0.55 | :Bucket Coefficient |
| E | 0.75 | :Working Efficiency |
| C | 14 | :Basic Cycle Time |
| D | 0.85 | :Coefficient Between Rotating Angle and Excavating Depth |

Workload of Hydraulic Shovel (aa-aa)
$V=3,600 \times Q \times K \times E / (C \times D)$

| V | 152.9 | :Workload Per Unit Time (m3/h) |
| Q | 1.4 | :Bucket Capacity (Pile Up) (m3) |
| K | 0.55 | :Bucket Coefficient |
| E | 0.75 | :Working Efficiency |
| C | 16 | :Basic Cycle Time |
| D | 0.85 | :Coefficient Between Rotating Angle and Excavating Depth |

—440

ON-SITE SYSTEM BUILDING SUPPORT TOOL

TECHNICAL FIELD

The present invention relates to an on-site system building support tool for assisting a user in building an on-site system by displaying, on a display unit, a configuration example of the on-site system, wherein the on-site system has a plurality of machines, each of which is self-propelled, travelable, or transportable, to treat objects to be processed in situ.

BACKGROUND ART

Patent document 1 described below discloses an apparatus for assisting in work of disassembling home electric appliances and OA products to collect reusable parts therefrom. This apparatus stores data about factories and workers beforehand. When information for identification of a waste article, which is an object to be processed, is inputted, the apparatus calculates costs and man-hour required to dispose of the waste article, kinds of parts that can be collected from the waste article, and the number of the parts. Thus, the apparatus plays a role of assisting in determining appropriate costs required for the disposal, and in carrying out efficient work.

DISCLOSURE OF THE INVENTION

Problems to be Solved by the Invention

Social demands for recycling of objects to be processed are increasing. The objects to be processed include various kinds of construction by-products and wastes covering not only construction soil, but also sludge, stones, wood, and mixed wastes. In addition, purification of contaminated soil (object to be processed) in a soil pollution site is also of urgent necessity. However, for the objects that require prompt action in this manner, there are a wide variety of objects with respect to properties, the size, the quality of material, and the like. Therefore, the scale and capability of a required system greatly differ for each object to be processed by the system.

Moreover, to prevent scattering of objects to be processed in the environment, it is not desirable that the objects be treated in a treatment plant after the objects is transported to the treatment plant through general roads. Instead of this method, it is desirable to build a processing system (on-site system) in situ where the objects have been produced, where the objects are treated. However, when an on-site system is built in situ where objects to be processed have been produced, the efforts, time, and costs required to design a plant on a site basis are enormous because sites differ from one another in location, area, and environment. For this reason, it is advantageous to build an on-site system suitable for site conditions by combining mobile products (self-propelled machine, travelable machine, or transportable machine) that are transportation vehicles, each of which can be moved through a general road.

According to the technology disclosed in the patent document 1 described above, the capability of a factory that disassembles a waste article to collect reusable parts is estimated beforehand. Accordingly, on the assumption of the estimated capability, the length of time required for processing is calculated as rough estimation. However, there are various kinds of sites requiring an on-site system. Conditions including geographical/physiographic conditions, narrowness of land, a shape of land, the amount of objects to be processed, and circumstances of an owner, also differ for each site. Therefore, a kind of a machine required for configuring an on-site system suitable for each individual site, and the number of the machines, are not determined unconditionally. Moreover, awareness of environmental problems typified by the recent global warming is socially growing. Therefore, when an object to be processed is treated, it is extremely important to take a load applied to environment into consideration.

The present invention has been made in view of the above-described situations. A primary object of the present invention is to provide an on-site system building support tool that is capable of flexibly and virtually building an on-site system by checking an environmental load in response to the various kinds of conditions of the site where an object to be processed has been produced.

Means for Solving the Problems (1) In order to achieve the above object, according to one aspect of the present invention, there is provided an on-site system building support tool for building an on-site system on a screen of a display unit to simulate the on-site system, the on-site system including a plurality of machines, each of which is self-propelled, travelable, or transportable, and the on-site system processing an object to be processed in situ where the object to be processed has been produced, wherein computing means performs the steps of:

displaying a layout creation screen on the display unit, the layout creation screen including:

an icon area for displaying a plurality of icons, each of which represents, in a discriminable manner, any of various kinds of machines that can be used in the on-site system, or any of processes to be performed in the on-site system; and a canvas area in which the on-site system is virtually built;

displaying, in the canvas area, an icon selected in the icon area, according to an operation signal from an operation device based on GUI operation;

after the plurality of icons are positioned in the canvas area, displaying, in the canvas area, a mark indicating, in a discriminable manner, how each process which is associated with the plurality of icons selected in the canvas area is connected to a previous or next process of each process;

when an icon is selected and clicked in the canvas area, displaying, on the display unit, a model setting screen used to specify a model of a machine to be used in a process associated with the selected icon, and to specify the number of the machines, and a workload of the machine; and on the basis of information about the number of machines corresponding to the model and the workload of the machine specified on the model setting screen and about fuel consumption provided beforehand, calculating a load which the on-site system virtually built on the canvas area applies to environment, and then displaying the result of the calculation on the display unit.

(2) In the above-described item (1), preferably, the computing means performs the step of, according to an operation signal from the operation device based on GUI operation, moving, in the canvas area, an icon positioned in the canvas area.

(3) In the above-described item (2), preferably, the computing means performs the step of updating the currently displayed mark, which is associated with the icon moved in the canvas area, in response to the move of the icon.

(4) In the above-described item (1), preferably, the mark is an association line that indicates, with an arrow, how each process which is associated with the plurality of icons selected in the canvas area is connected to a previous or next process of each process.

(5) In the above-described item (1) or (2), preferably, the GUI operation is drag-and-drop operation or copy-and-paste operation.

(6) In the above-described item (1), preferably, if a particular icon representing a machine or a process involves branching of flow of a processed object, the icon has a ratio setting object used to specify a sorting ratio of the processed object.

(7) In the above-described item (1), preferably, the load applied to environment is the amount of $CO_2$ emission calculated on the basis of the consumed quantity of fuel of each model specified on the model setting screen.

(8) In the above-described item (1), preferably, the model setting screen has an object used for displaying a machine-body information screen on which reference information about a model of a machine to be used can be viewed.

(9) In the above-described item (1), preferably, the icon area includes the icon that is associated with a sorting machine for sorting processed objects; the icon that is associated with a feeding machine for supplying the sorting machine with an object to be processed; and the icon that is associated with a transporting machine for transporting an object to be processed or a processed object.

Effects of the Invention

According to the present invention, an on-site system can be flexibly and virtually built by checking an environmental load on the basis of various kinds of conditions of a site where an object to be processed has been produced.

BRIEF DESCRIPTION OF THE DRAWINGS

FIG. 14 is a diagram illustrating a condition list screen of the on-site system building support tool according to one embodiment of the present invention;

FIG. 15 is a diagram illustrating a calculation result screen of the on-site system building support tool according to one embodiment of the present invention;

FIG. 16 is a diagram illustrating a model setting screen of the on-site system building support tool according to one embodiment of the present invention;

FIG. 17 is a diagram illustrating a model setting screen of the on-site system building support tool according to one embodiment of the present invention;

FIG. 28 is a diagram illustrating a technical information screen of the on-site system building support tool according to one embodiment of the present invention;

FIG. 29 is a diagram illustrating a technical information screen of the on-site system building support tool according to one embodiment of the present invention;

FIG. 30 is a diagram illustrating a technical information screen of the on-site system building support tool according to one embodiment of the present invention;

FIG. 31 is a diagram illustrating a technical information screen of the on-site system building support tool according to one embodiment of the present invention;

DESCRIPTION OF REFERENCE NUMBERS

Figure 1:
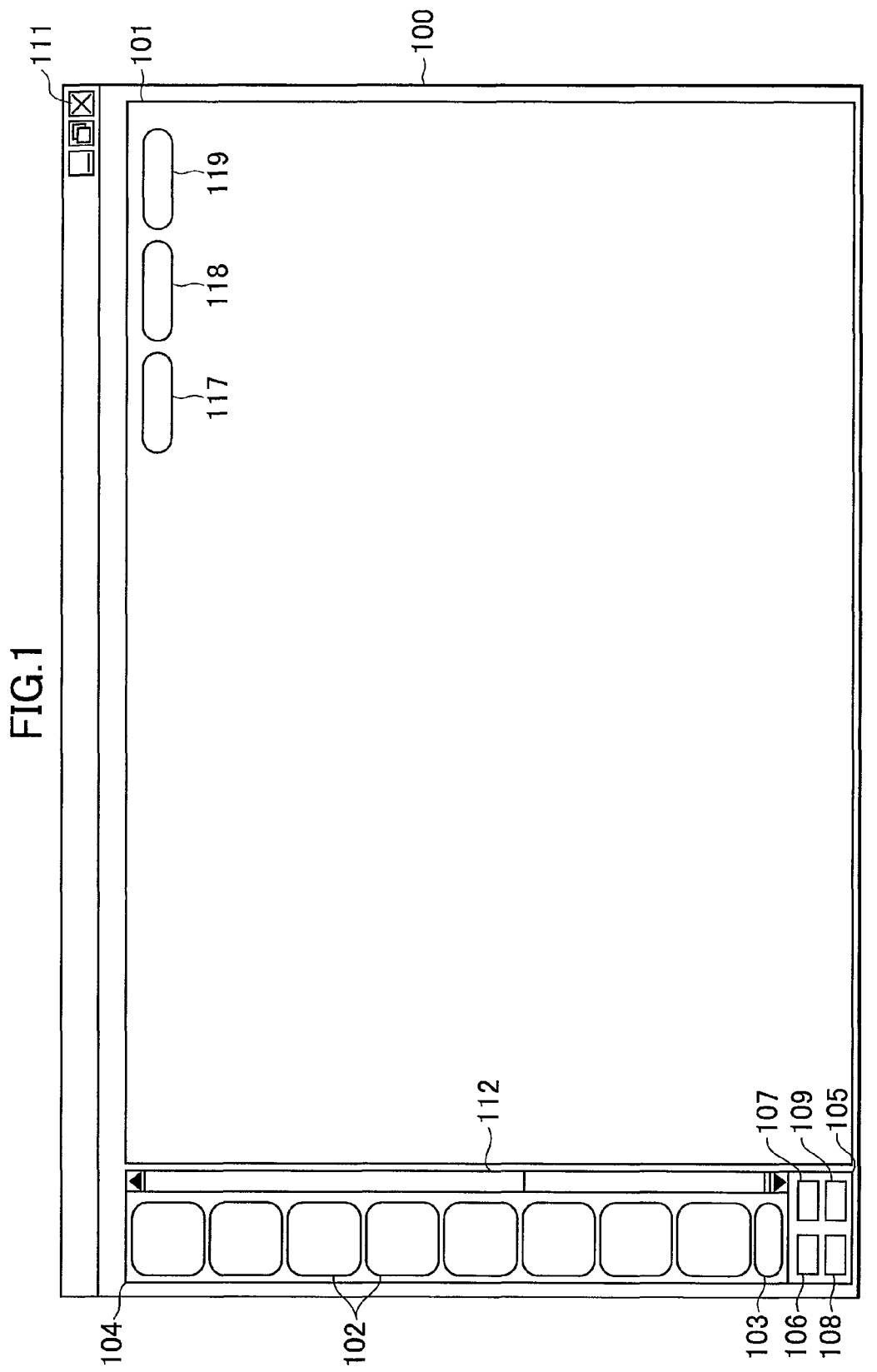
FIG. 1 is a diagram illustrating a layout creation screen that is displayed after an on-site system building support tool is started according to one embodiment of the present invention.

2 On-site system building support tool
12 Operation device
13 Display unit
16 CPU
100 Layout creation screen
101 Canvas area
102, 102a through l Icon
103, 103a through l Icon
104 Icon area
120 Association line
190 Calculation result display screen
210, 220, 230, 240, 250 Setting screen
211, 212, 213, 221, 231, 232, 241, 251 Button
310, 320, 330, 340, 350, 360 Machine-body information screen

BEST MODE FOR CARRYING OUT THE INVENTION

Embodiments of the present invention will be described below with reference to accompanying drawings.

(1) Overview of On-Site System Building Support Tool

An on-site system building support tool (hereinafter referred to as "the present tool") according to the present invention is used to virtually build the overall flow of an on-site system on a display screen of a terminal, and to specify a model of a machine to be used, the number of the machines, and a workload of the machine, on a process basis so as to simulate a load (environmental load) which the virtually built on-site system applies to environment. Thus, the present tool flexibly assists a customer in implementation planning of an on-site system. As a matter of course, not only an environmental load but also various expenses including the initial and running costs of a virtually built on-site system can also be roughly estimated on the basis of a model of a machine to be used, the number of the machines, and the operating time of the machine. Each kind of processes of an on-site system to be virtually built, the order of the processes, and the like, can be changed at any time on the screen.

In this embodiment, an on-site system will be described by taking as an example a case where a waste disposal system for processing wastes in a waste disposal site such as an illegal dumping site is built with the present tool so as to simulate an environmental load. However, although details will be described last, application of the present tool is not limited to building support of a waste disposal system. The present tool can also be widely applied to building support of other on-site systems. The on-site system described here is a system built by carrying a plurality of machines into a site. The on-site system designates a system for processing objects to be processed in a site in which the objects are produced. In particular, the machines carried into the site include: a self-propelled machine having a function of traveling by itself by use of travelling means such as a crawler or a wheel; a travelable machine that has travelling means although the travelable machine does not have a function of traveling by itself, or that is capable of traction travelling if the travelable machine is provided with travelling means; or a transportable machine that can be transported by means of a crane, a truck, a fork lift, or the like, although the transportable machine does not have a travelling function. It is mainly assumed that the machines are mobile products that can be transported along public roads by a truck or a trailer.

Incidentally, wastes that are objects to be processed by a waste disposal system described in this embodiment include not only wastes which are legally classified as "industrial wastes" but also wastes which are classified as "general wastes". For example, the wastes described in this embodiment includes various kinds of wastes, ranging from contaminated soil, asphaltic wastes, concrete masses, reinforcing steel, steel frames, waste metal (for example, an aluminum sash), various kinds of electrical products, office supplies, furnishing goods, waste fiber, wood wastes to raw garbage and household refuse. The wastes in this embodiment may also include wastes other than those listed here.

In general, a waste disposal system includes at least a sorting machine for sorting recyclable raw materials from wastes that are objects to be processed, a feeding machine for feeding wastes into the sorting machine, and a transporting machine for transporting wastes. However, besides the above-described machines, it is possible to place various kinds of machines including: a excavating/loading machine (for example, a hydraulic shovel) that is used to excavate wastes buried underground, and that is used to load the wastes onto another machine; a soil-quality improving machine for improving the quality of wastes (for example, poor-quality soil and contaminated soil); a crushing machine for crushing wastes; a screening machine (for example, a screener) for screening wastes, processed objects, or the like, by specified particle size; a liquefied soil stabilization machine; a conveyer for conveying wastes and processed objects; and a transporting machine (for example, a truck) for transporting wastes and processed objects. Even if only crushing machines are discussed, there are various kinds of crushing machines, each corresponding to how it is used. To be more specific, crushing machines are classified into: jaw crushers, and impact crushers, for crushing rock and concrete masses; shredders for shredding miscellaneous objects including home electric appliances, discarded tires, and tatami mats; wood crushers for crushing waste wood; and the like. Therefore, the capability and functions required for the waste disposal system differ on a site basis; and the result of simulation also largely differs depending on conditions. In addition, from the viewpoint of environmental protection, scale of an on-site system can also be limited within a range within which the result of simulation satisfies a desired reference value.

(2) Layout Creation Screen

FIG. 1 is a diagram illustrating a screen displayed after the present tool is started up.

A layout creation screen 100 of the present tool shown in FIG. 1 is provided with: a canvas area 101 in which an on-site system is virtually built; an icon area 104 for displaying icons 102 and 103, each of which is optionally positioned in the canvas area 101; and a menu area 105 in which various kinds of file operation are performed.

Figure 2:
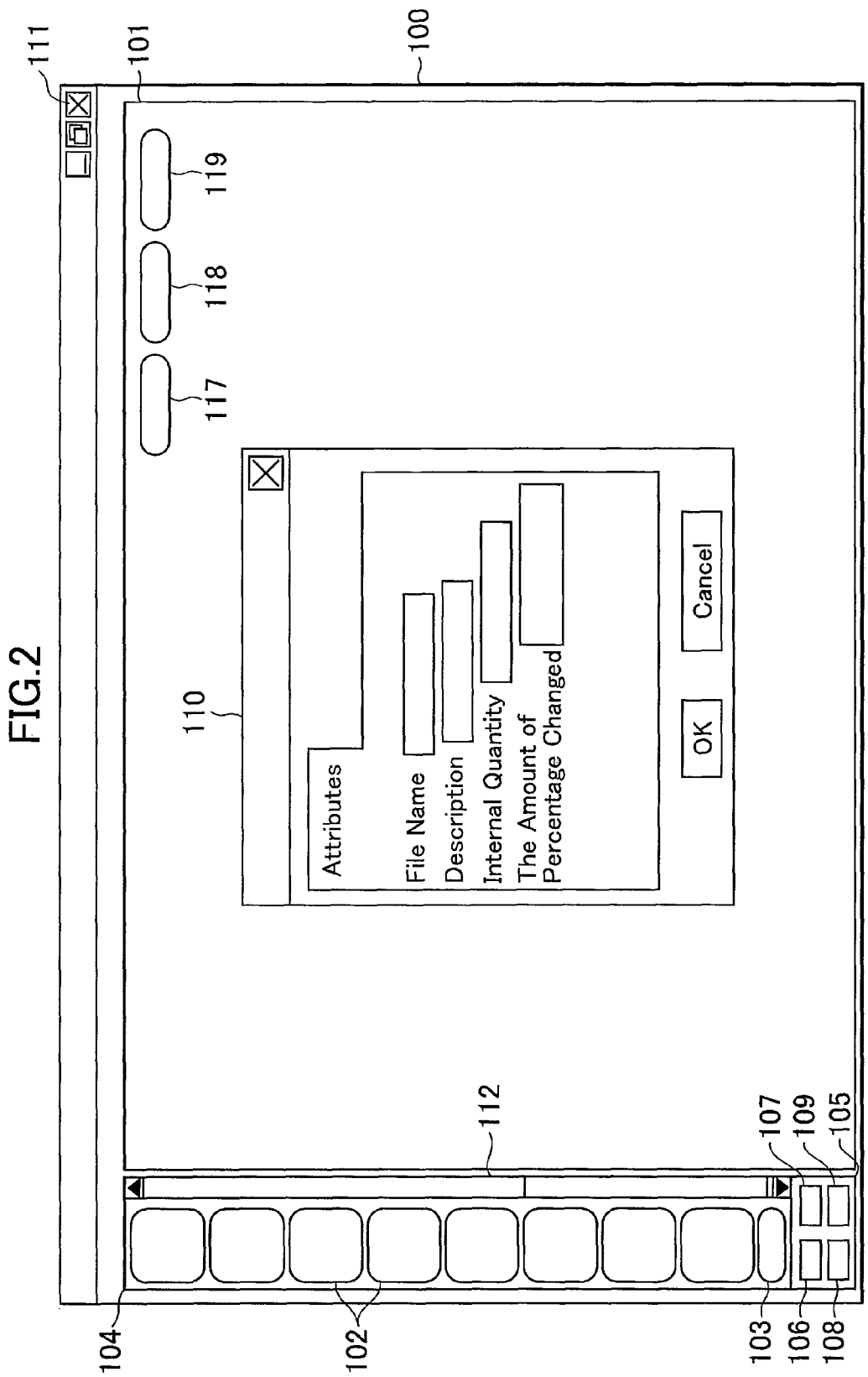
FIG. 2 is a diagram illustrating an initial setting screen of the layout creation screen of the on-site system building support tool according to one embodiment of the present invention.

The menu area 105 displays a "New" button 106, an "Edit" button 107, a "Save" button 108, and an "Open" button 109. In order to newly create a file of the present tool, the "New" button 106 is selected in the menu area 105. A name of the file to be newly created is specified on an initial setting screen 110 (refer to FIG. 2). The initial setting screen 110 is displayed by clicking, for example, the "New" button 106. The initial setting screen 110 used to specify not only the file name, but also brief description of the file, the total volume of objects to be processed by the on-site system, a branching ratio, and the like. In order to save a file that is being edited, the "Save" button 108 is clicked. In this case, the edited file whose file name has been specified on the initial setting screen 110 is saved. In order to change the file name before the file is saved, the "Edit" button 107 is clicked to display the initial setting screen 110, and the file name is then changed to a desired one on the initial setting screen 110, before the "Save" button 108 is clicked. In order to read a file that has been already created, the "Open" button 109 is clicked to display a file selection screen (not illustrated), and a name of the file to be read is then specified on the file selection screen to open the file. In order to end the operation of the present tool, an "End" button 111 is clicked to close the layout creation screen 100.

The icon area 104 is provided with a large number of icons 102 and 103 beforehand. A user can use a scroll bar 112 to scroll the icon area 104 so as to display and select icons that cannot be displayed in the icon area 104 at a time.

Figure 3:
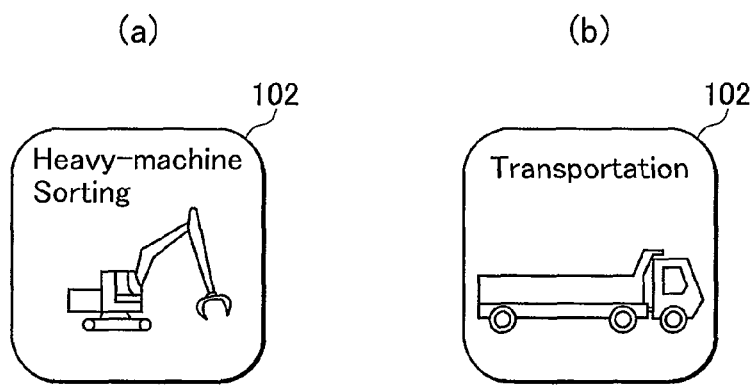
FIGS. 3(a) and 3(b) are enlarged views each illustrating an icon displayed in an icon area of the layout creation screen of the on-site system building support tool according to one embodiment of the present invention.

FIGS. 3(a) and 3(b) are enlarged views of the icons 102.

As shown in FIGS. 3(a) and 3(b), in the icons 102 displayed in the icon area 104, illustrations are used to represent various kinds of machines that can be used in the on-site system. The representation of the machines is not limited to the illustrations. The various kinds of machines may also be represented in any mode in which the machines can be discriminated from one another. For example, images (photographs), names (character strings), or the like, may also be used to represent the machines. Further, according to this embodiment, in addition to the representation of the various kinds of machines, names of various kinds of processes required by the on-site system are represented in the icons 102 by use of character strings. The representation of the processes is also not limited to the character strings. The various kinds of processes may also be represented in any mode in which the processes can be discriminated from one another. For example, illustrations, images, or the like, may also be used to represent the processes. Representation of either the processes or the machines also suffices.

Each of the icons 102 and 103 in the icon area 104 can be copied from the icon area 104 to any position in the canvas area 101 through GUI operation. The GUI operation described here means, what is called, drag-and-drop operation and copy-and-paste operation. In the case of the drag-and-drop operation, any of the icons 102 and 103 in the icon area 104 is pointed to with a mouse, and the icon 102 or 103 that is pointed to is then dragged and dropped into the canvas area 101 with the mouse. As a result, a copy of the dragged icon 102 is displayed at a position at which the icon 102 has been dropped in the canvas area 101 (refer to FIG. 6 described below). The icon 102 which has been positioned in the canvas area 101 is linked to a specific model setting screen (for example, any of model setting screens 210 through 250 shown in FIG. 13). The model setting screen to which the icon 102 is linked used to specify various kinds of conditions including a model of a machine to be used in the process, the number of the machines, and the operating time thereof.

Figure 4:
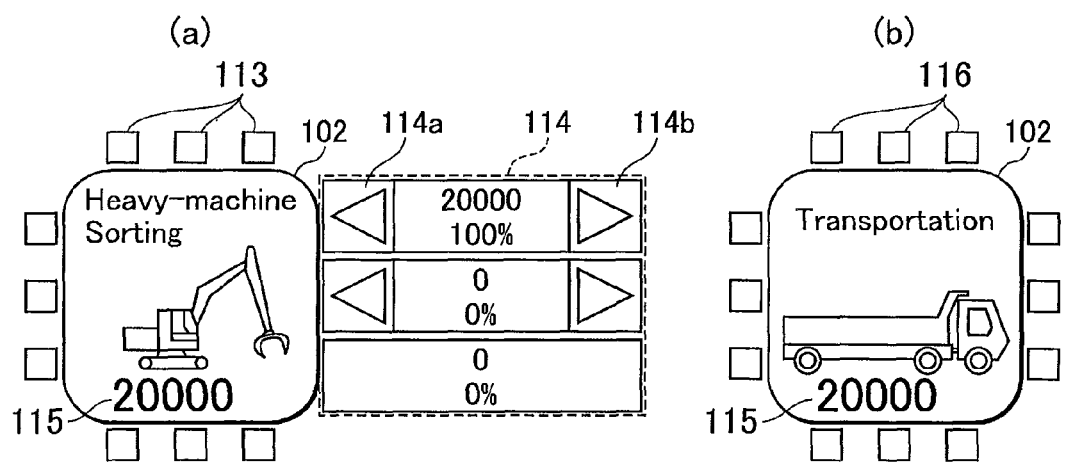
FIGS. 4(a) and 4(b) are enlarged views each illustrating an icon positioned in a canvas area of the layout creation screen of the on-site system building support tool according to one embodiment of the present invention.

FIGS. 4(a) and 4(b) are enlarged views of the icons 102 positioned in the canvas area 101.

As shown in FIGS. 4(a) and 4(b), each of the icons 102 positioned in the canvas area 101 involves objects required to express the association of this icon 102 with the other icons 102. For example, as shown in FIG. 4(a), if the icon 102 represents a machine or a process, which involves branching of flow of processed objects, the icon 102 includes: input points 113 (the number of input points 113 may also be one although the plurality of input points are illustrated in the figure), each of which is an end point of an association line 120 (refer to FIG. 7) from the icon 102 or 103 of the previous process; and a plurality of output points 114, each of which is a start point of an association line 120 to the icon 102 or 103 of the next process. FIG. 4(a) illustrates a case where the input points 113 are provided on the top, bottom, and left sides of the icon 102, and where the output points 114 are provided on the right side of the icon 102. However, how to design the layout of the icon 102 involving the input points 113 and the output points 114 is not particularly limited.

In addition, each of the icons 102 positioned in the canvas area 10 is provided with a processed-amount display field 115 for displaying the amount of processed objects in the process. A value displayed in the processed-amount display field 115 is equivalent to the distributed amount assumed based on the association line 120 from the previous process. A value specified on the initial setting screen 110 is displayed in the processed-amount display field 115 corresponding to a first process. A value displayed in the processed-amount display field 115 of the icon 102 connected through the association line 120 can also be changed by direct input operation. After the value is changed, a value displayed in the processed-amount display field 115 of each of the icons 102, and the total processed amount (a set value displayed in the initial setting screen 110), are also changed in synchronization with the changed value. Further, the process displaying and machine displaying of each of the icons 102 can also be changed after the icon 102 is positioned in the canvas area 101. For example, when a process name is selectively or directly inputted so that a displayed process name is changed to the inputted process name, the machine displaying, and the link to the model setting screen (for example, any of the model setting screens 210 through 250 shown in FIG. 13), are also changed in synchronization with the inputted process name.

If the icon 102 has two or more next processes (if the flow of the processed objects branches out), each of the above-described output points 114 functions as a ratio setting object used to specify a sorting ratio of the processed objects. According to this embodiment, three output points 114 are provided. However, if it is requested that the flow branching out into three or more be expressed, the number of output points 114 of the icon 102 may also be increased. If the flow of the processed objects branches out into two, the number of output points 114 may also be two. In any event, for output points 114 of one icon 102, ratios (percentages) of processed objects displayed in the output points 114, which are connected to other icons 102 through the association lines 120, are 100% in total. In the case of this embodiment, if each of ratios of two output points 114 on the upper side is changed, a ratio and the processed amount in each of the output points 114 are automatically changed in synchronization with the changed ratio. When a user changes a ratio, the user can use each of slider switches 114a and 114b of the output point 114 to increase or decrease the ratio. Alternatively, the user may also directly input a numerical value into the output point 114.

In addition, if the icon 102 is associated with only one next process (in other words, the flow of processed objects does not branch out), the icon 102 is not provided with an output point representing branching of the processed objects. The icon 102 is provided with only input/output points 116 each functioning as a start or end point of an association line 120 through which the icon 102 is connected to another icon 102 or 103. According to this embodiment, the input/output points 116 are provided on the top, bottom, left, and right sides of the icon 102. However, how to design the layout of the input/output points 116 is not particularly limited.

Figure 5:
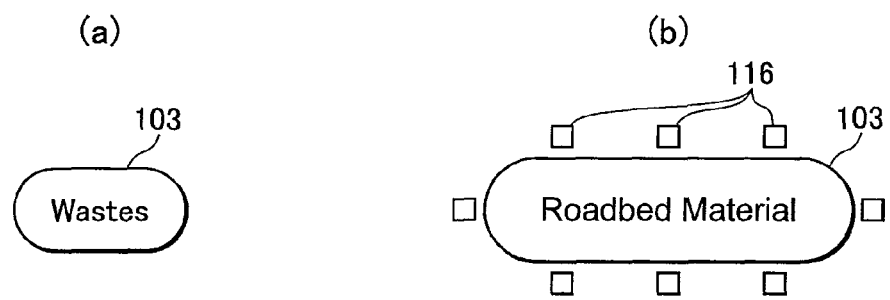
FIGS. 5(a) and 5(b) are enlarged views each illustrating an icon positioned in the canvas area of the layout creation screen of the on-site system building support tool according to one embodiment of the present invention.

FIGS. 5(a) and 5(b) are enlarged views of the icons 103 positioned in the canvas area 101.

The icon 103 differs from the icons 102 that are prepared beforehand as options to select various kinds of processes forming the on-site system, and that link to the model setting screen. The icon 103 is a general-purpose icon that is supplementarily used to display, in the canvas area 101, text strings including a kind of processed objects, and the physical distribution of the processed objects. The text strings to be displayed can be changed even after the icon 103 is positioned in the canvas area 101. A display color of the icon 103 and that of the text strings (text) can also be changed. The icon 103, therefore, may also be configured to be a simple text box that does not have an input/output point 116 as shown in FIG. 5(a). Alternatively, as shown in FIG. 5(b), the icon 103 may also be configured to be a text box that is provided with input/output points 116 when the icon 103 is positioned in the canvas area 101.

As shown in, for example, FIG. 1, a "Verify calculation input" button 117, an "Execute calculation" button 118, and a "Print" button 119 are displayed in the canvas area 101. These buttons 117 through 119 are always displayed in the canvas area 101 at fixed positions. The "Verify calculation input" button 117 is a button that is used to verify settings made on an undermentioned model setting screen (for example, any of model setting screens 210 through 250 shown in FIG. 13). Clicking the "Verify calculation input" button 117 causes a condition list screen 180 for displaying a list of various settings to be displayed (refer to FIG. 14). Clicking the "Execute calculation" button 118 causes various items such as a load which the on-site system virtually built on the canvas area 101 applies to environment, to be calculated according to current settings. Then, a calculation result display screen 190 for displaying the result of the calculation (refer to FIG. 15) are displayed. Clicking the "Print" button 119 causes current data displayed on the layout creation screen 100 to be printed out.

(3) How to Virtually Build On-Site System

Figure 6:
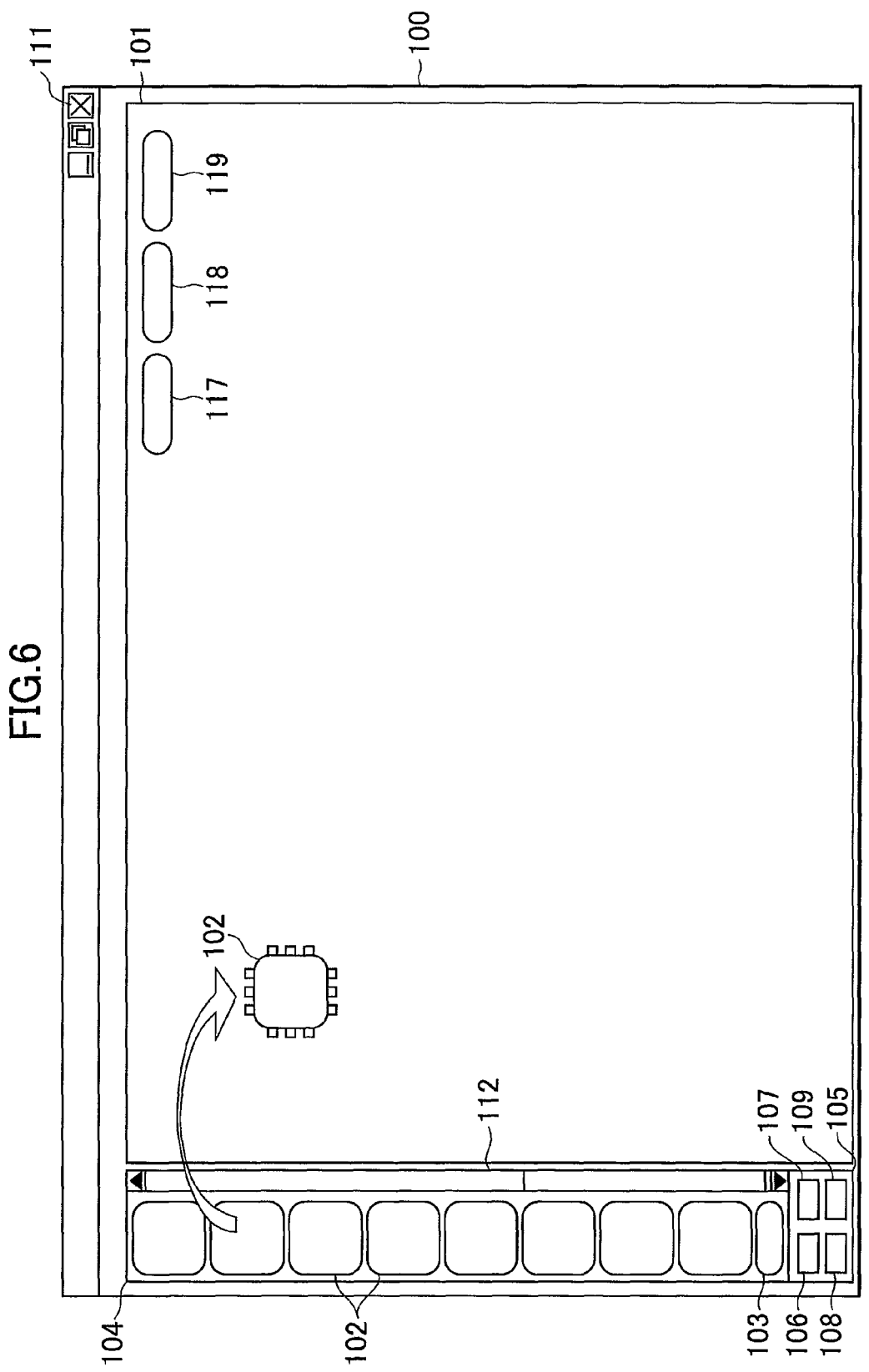
FIG. 6 is a diagram illustrating how to virtually build an on-site system on the layout creation screen of the on-site system building support tool according to one embodiment of the present invention.
Figure 7:
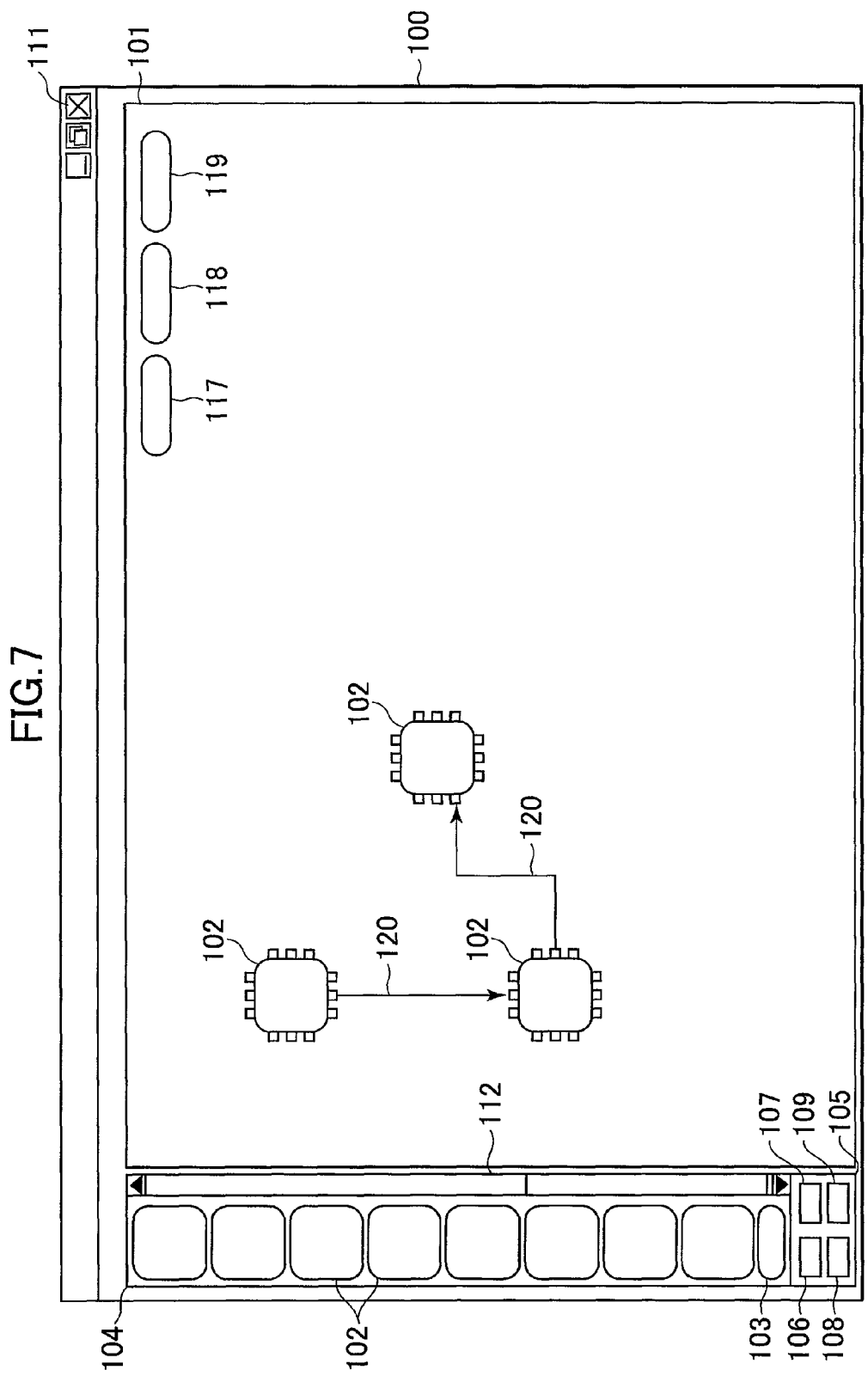
FIG. 7 is a diagram illustrating how to virtually build an on-site system on the layout creation screen of the on-site system building support tool according to one embodiment of the present invention.

When an on-site system is virtually built in the canvas area 101, for example, if a user newly creates a file, the user clicks the "New" button 106 to display the initial setting screen 110, and then makes entries of required items. Next, as shown in FIG. 6, the user drags and drops any of the icons 102 from the icon area 104 to the canvas area 101 so that the icon 102 is positioned at a desired position. Moreover, as shown in FIG. 7, every time an icon 102 is added to the canvas area 101 as required, two icons 102 (or 103) in the canvas area 101, which correspond to previous and next processes in the process flow, are connected to each other by use of an association line 120. A start point of one association line 120 is any one of the output point 114 of the icon 102, the input/output point 116 of the icon 102, and the input/output point 116 of the icon 103. An end point of the association line 120 is either the input point 113 of the icon 102 or the input/output point 116 of the icon 102 or 103. The association line 120 is displayed when a start point and an end point are specified with, for example, a pointing device.

Figure 8:
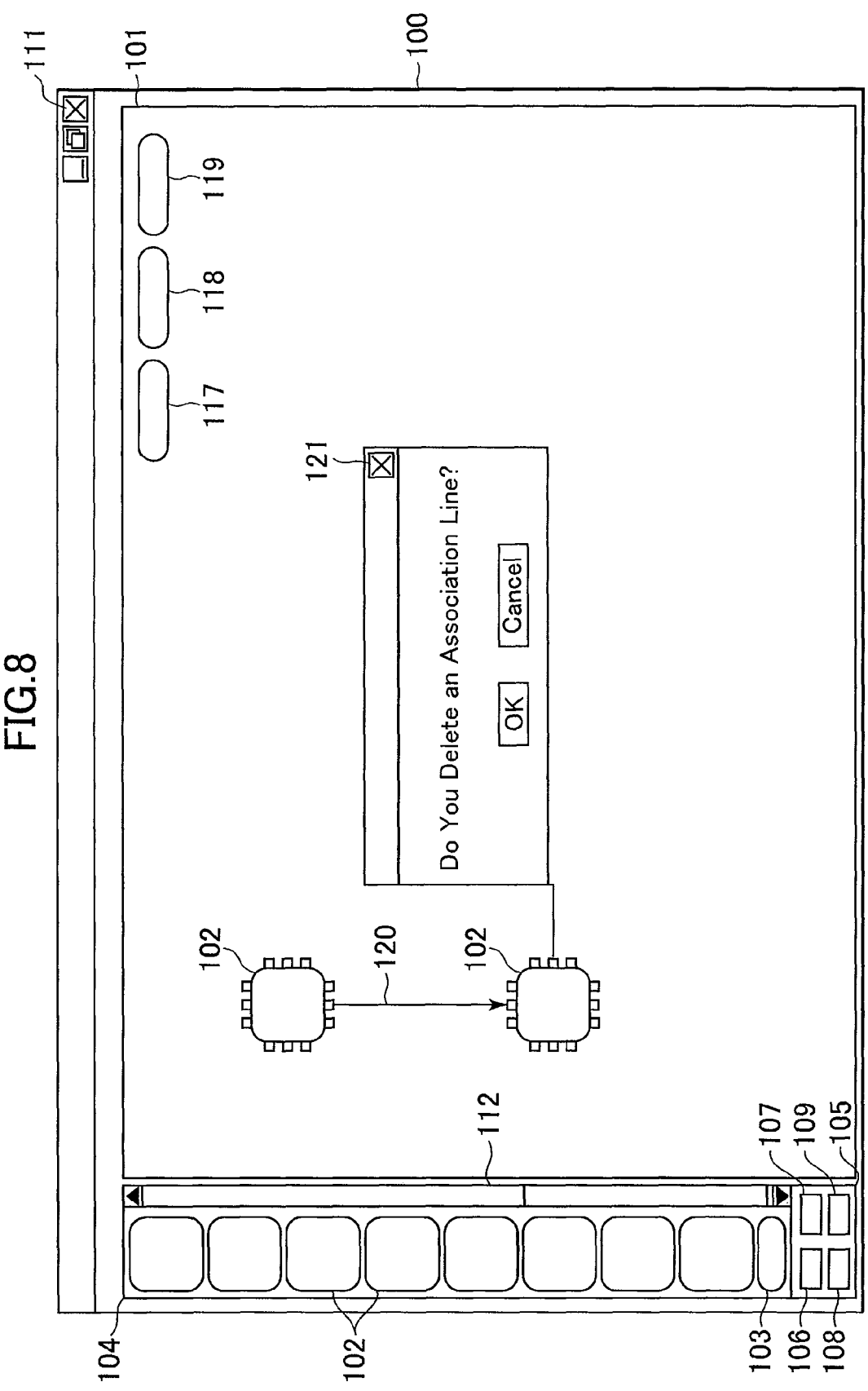
FIG. 8 is a diagram illustrating how to virtually build an on-site system on the layout creation screen of the on-site system building support tool according to one embodiment of the present invention.

In order to delete the association line 120, it is necessary to display a confirmation screen 121 for prompting the user as to whether or not to delete the association line 120 shown in FIG. 8 (the confirmation screen 121 is displayed when, for example, the user double-clicks the association line 120 to be deleted). The user then clicks an "OK" button displayed in the confirmation screen 121. Alternatively, the association line 120 may also be deleted by selecting the association line 120 to be deleted, and then by pressing a "Delete" button (for example, a "Delete" key) of an input device (for example, a keyboard).

Figure 9:
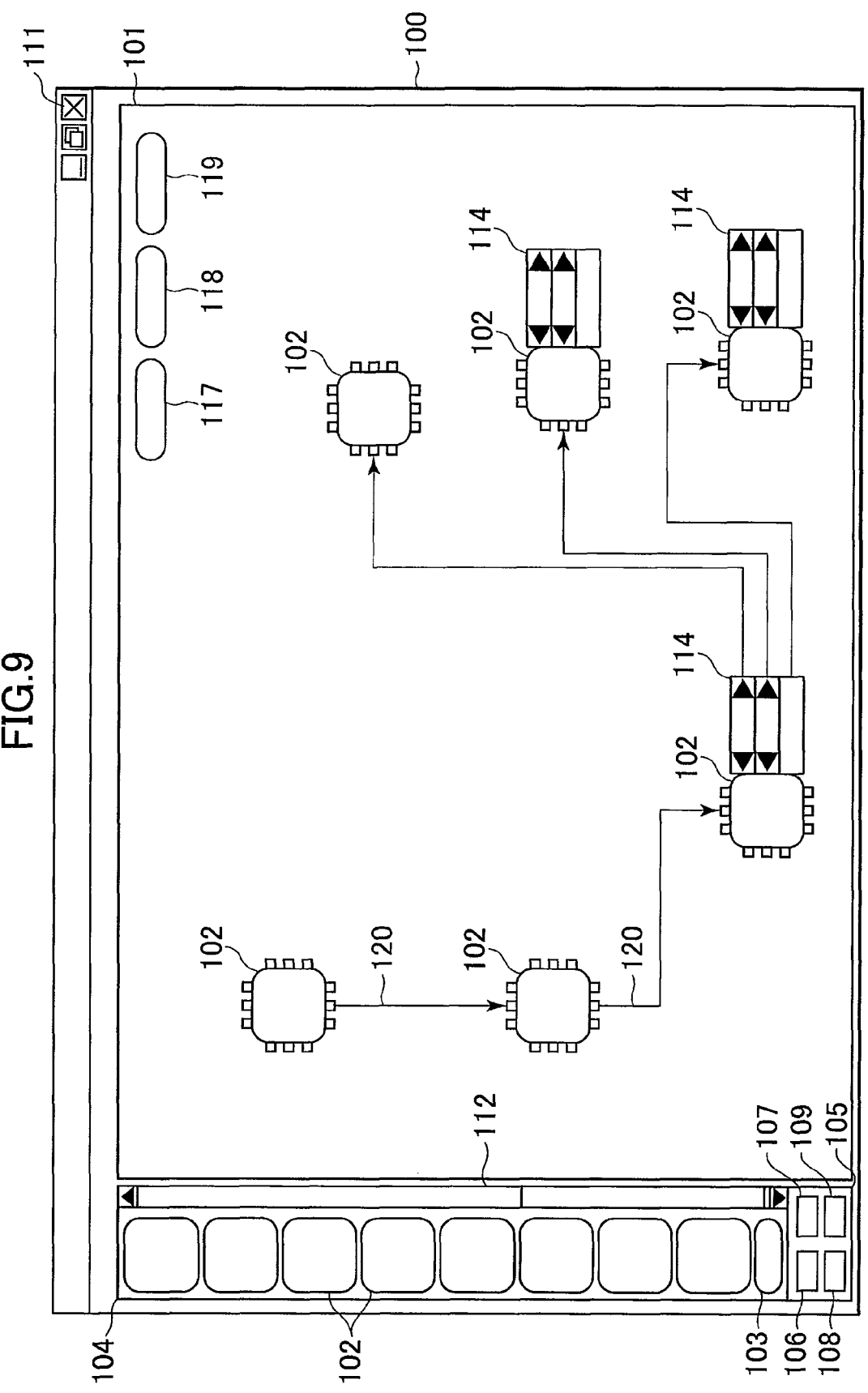
FIG. 9 is a diagram illustrating how to virtually build an on-site system on the layout creation screen of the on-site system building support tool according to one embodiment of the present invention.
Figure 10:
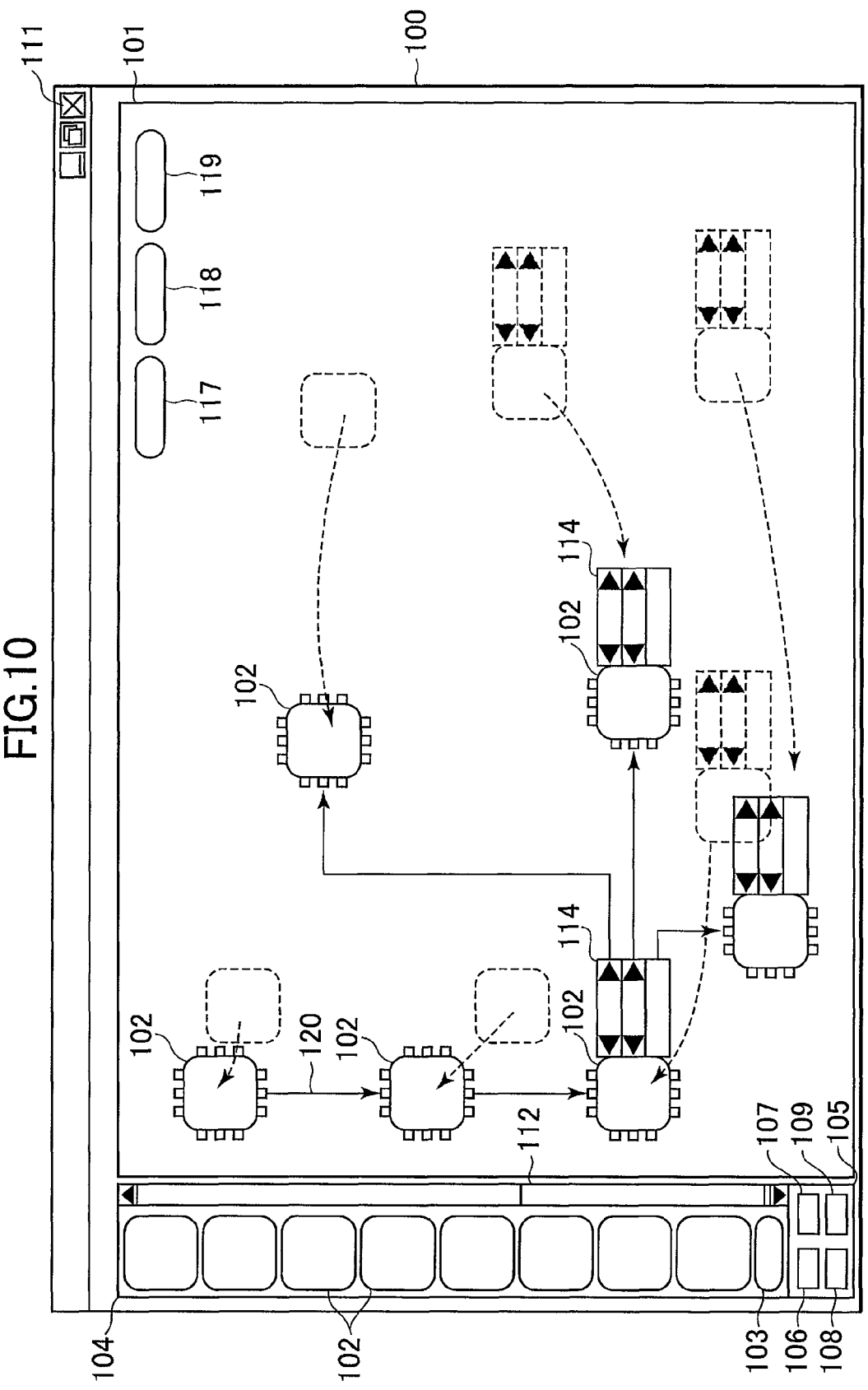
FIG. 10 is a diagram illustrating how to virtually build an on-site system on the layout creation screen of the on-site system building support tool according to one embodiment of the present invention.
Figure 11:
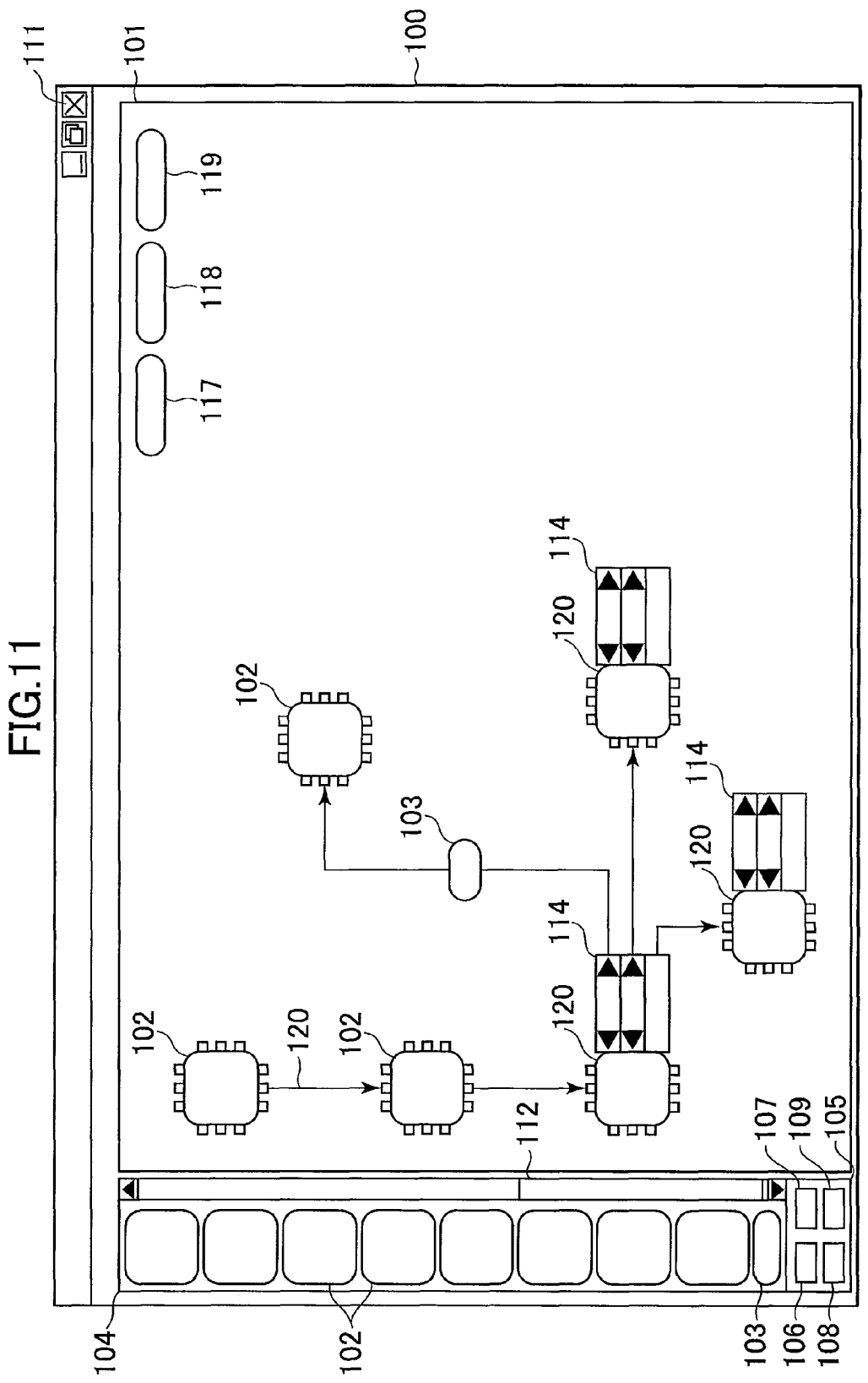
FIG. 11 is a diagram illustrating how to virtually build an on-site system on the layout creation screen of the on-site system building support tool according to one embodiment of the present invention.
Figure 12:
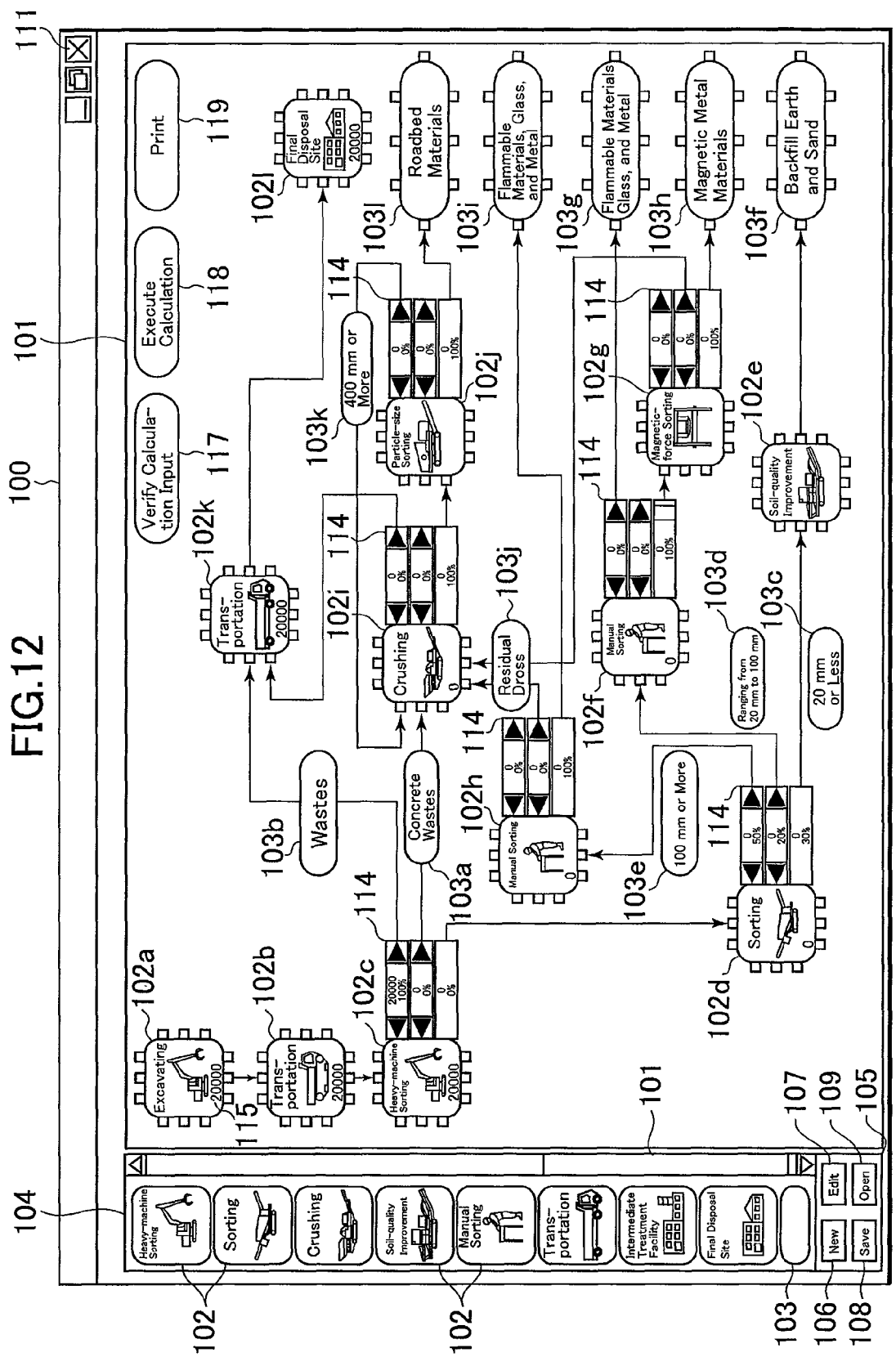
FIG. 12 is a diagram illustrating an example of an on-site system virtually built on the layout creation screen of the on-site system building support tool according to one embodiment of the present invention.

Moreover, the on-site system is built in the canvas area 101, for example, by: positioning an icon 102 having an output port 114 in the canvas area 101, and then adding the icon 102 to the flow by connecting the icon 102 through an association line 120 (refer to FIG. 9); dragging each icon 102 (or using arrow keys of the keyboard) to move the icon 102 in the canvas area 101 (refer to FIG. 10); and positioning a text icon 103 if necessary to display, for example, the flow and description of processed objects at a desired position in the canvas area 101 (refer to FIG. 11). As shown in FIG. 10, if the icon 102 or 103 connected through the association line 120 is moved in the canvas area 101, the displayed association line 120 is also updated according to a location of the icon 102 or 103 after the move. FIG. 12 is a diagram illustrating an example of the on-site system that has been virtually built in the canvas area 101 in the manner described above.

(4) Hierarchical Structure of Interface Screen of the Present Tool

Figure 13:
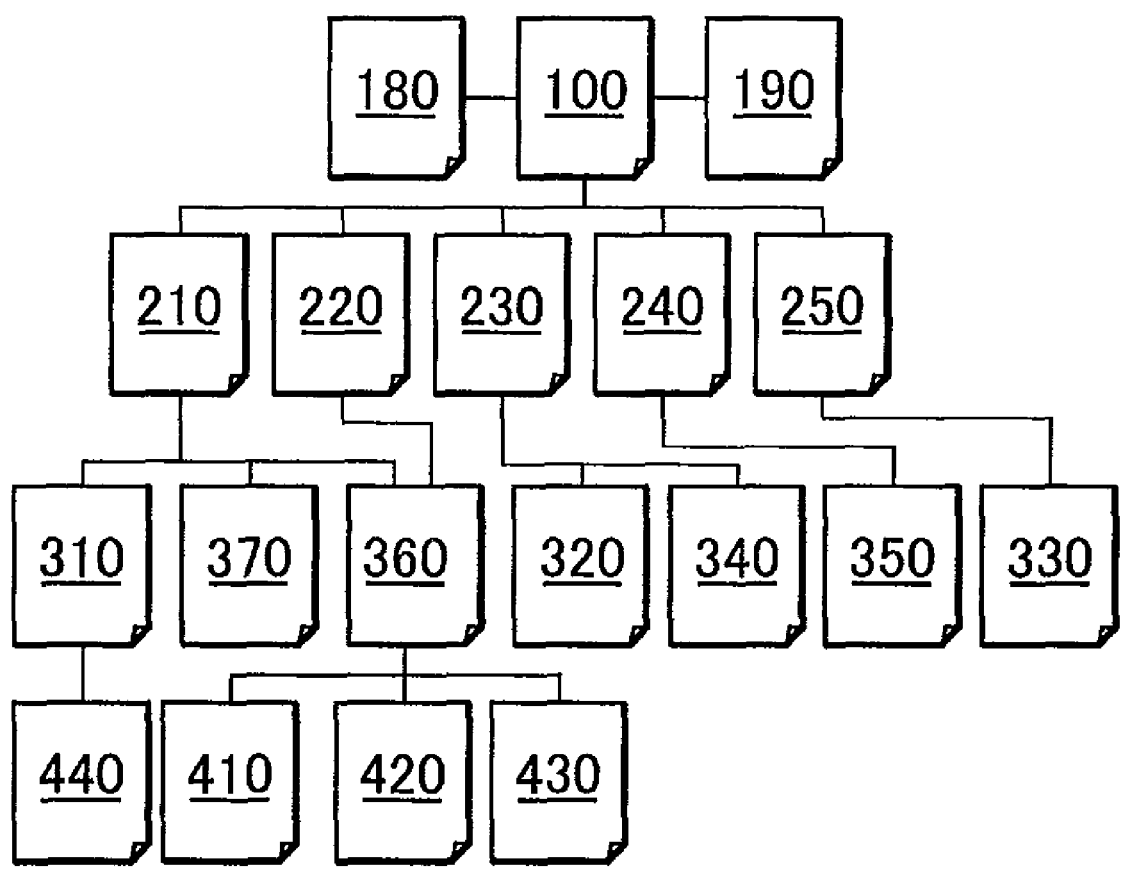
FIG. 13 is a conceptual diagram illustrating a hierarchical structure of screens of the on-site system building support tool according to one embodiment of the present invention.

An interface screen of the present tool has a hierarchical structure. The layout creation screen 100 described above is a screen belonging to a highest-level layer of the interface screen (the highest-level layer is defined as a "first layer"). If the layout creation screen 100 illustrated in FIG. 12 is taken as an example, the hierarchical structure of the interface screen of the present tool is configured as shown in FIG. 13. Because an interface screen (the above-described model setting screen) of a second layer links to the icon 102 displayed on the layout creation screen 100, the hierarchical structure shown in FIG. 13 changes depending on a kind of the icon 102 positioned in the canvas area 101 of the layout creation screen 100. The "layers" described here are used to classify screens based on displayed information. Accordingly, each of the "layers" indicates that information displayed on a screen is conceptually higher or lower. The "layers", therefore, are not intended to indicate physical locations of screens or the positional relationship (upper or lower) between screens when the screens are displayed. Next, taking the layout creation screen 100 shown in FIG. 12 as an example, a screen in each layer will be described below.

(4-1) Description of First Layer Screens

Referring to the on-site system virtually built on the layout creation screen 100 shown in FIG. 12, because icons 102a through 102l corresponding to individual processes are connected to one another through association lines 102, it is easy to intuitively grasp processing steps. In addition, because icons 103a through 103l are also displayed along the flow of the icons 102a through 102l, the physical distribution is also easy to visually grasp.

The icon 102a represents an excavating process. For example, because an illegal dumping site may contain wastes with the wastes buried underground, it is necessary to excavate (mine) the wastes as required. Next, when the icon 102a is manipulated (for example, double clicked), the model setting screen 210 used to set conditions of mining (a model of a machine to be used, the number of the machines, the operating time of the machine, and the like) is displayed (refer to FIG. 16). The amount of mined wastes (that is to say, the total amount of wastes inputted into the on-site system) is displayed in the processed-amount display field 115 of the icon 102a.

The icon 102b represents a transportation process. The icon 102b also serves as a switch by which the corresponding model setting screen 220 (refer to FIG. 17) of the second layer is displayed. Here, the wastes excavated in the excavating process 102a are transported to a heavy-machine sorting process.

The icon 102c represents a heavy-machine sorting process. The icon 102c also serves as a switch by which the corresponding model setting screen 230 (refer to FIG. 18) of the second layer is displayed. In the heavy-machine sorting process, the wastes from the transportation process displayed as the icon 102b are sorted into: wastes to be forwarded to a size screening process; concrete wastes (displayed as the icon 103a) to be forwarded to a crushing process; and wastes (displayed as the icon 103b) to be forwarded to a transportation process for transporting the wastes to a final disposal site (displayed as the icon 102l). These sorting ratios are specified in the output point 114 used as the ratio setting object of the icon 102c. The sorting ratios (percentages) and the branching amount, which have been specified, are reflected on information displayed in the output point 114 of the icon 102c.

The icon 102d represents a size screening process. The icon 102d also serves as a switch by which the corresponding model setting screen 230 (refer to FIG. 18) of the second layer is displayed. Here, it is assumed that the processed objects are sorted into three particle-size constituents: objects having a particle diameter of 20 mm or less (displayed as the icon 103c); objects having a particle diameter ranging from 20 mm to 100 mm (displayed as the icon 103d); and objects having a particle diameter of 100 mm or more (displayed as the icon 103e). Sorting ratios to be used are specified in the output point 114 of the icon 102d. The sorting ratios (percentages) and the branching amount, which have been specified, are reflected on information displayed in the output point 114 of the icon 102d.

The icon 102e represents a soil-quality improvement process. The icon 102e also serves as a switch by which the corresponding model setting screen 250 (refer to FIG. 19) of the second layer is displayed. In this case, earth and sand having a particle diameter of 20 mm or less (the smallest particle diameter), which have been sorted in the size screening process, are mixed with a soil-quality improving material to improve the soil quality of the earth and sand. An excavated area is then backfilled with the backfill earth and sand (displayed as the icon 103f) whose soil-quality has been improved.

The icon 102f represents a manual sorting process. Here, objects having a particle diameter ranging from 20 mm to 100 mm, which have been sorted in the size screening process, are sorted into: flammable materials, glass materials, and metal materials (displayed as the icon 103g); and others. Sorting ratios used here are specified in the output point 114 of the icon 102f. The sorting ratios (percentages) and the branching amount, which have been specified, are reflected on information displayed in the output point 114 of the icon 102f.

The icon 102g represents a magnetic-force sorting process. Here, a magnetic separator, or the like, is used to remove magnetic metal materials (displayed as the icon 103h) from constituents other than the flammable materials, the glass materials, and the metal materials which have been sorted in the manual sorting process represented by the icon 102f. Sorting ratios used here are specified in the output point 114 of the icon 102g. The sorting ratios (percentages) and the branching amount, which have been specified, are reflected on information displayed in the output point 114 of the icon 102g.

The icon 102h represents a manual sorting process. Here, objects having a particle diameter of 100 mm or more, which have been sorted in the size screening process, are sorted into: flammable materials, glass materials, and metal materials (displayed as the icon 103i); and others (residual dross) (displayed as the icon 103j). Sorting ratios used here are specified in the output point 114 of the icon 102h. The sorting ratios (percentages) and the branching amount, which have been specified, are reflected on information displayed in the output point 114 of the icon 102h.

The icon 102i represents a crushing process. The icon 102i also serves as a switch by which the corresponding model setting screen 250 (refer to FIG. 20) of the second layer is displayed. Here, the concrete wastes sorted in the heavy-machine sorting process (the icon 103a) are crushed together with the residual dross (the icon 103j) sorted in the manual sorting process and the magnetic-force sorting process. Additionally, in this crushing process, foreign particles are eliminated by an optionally equipped sorter during crushing. Sorting ratios used here are specified in the output point 114 of the icon 102i. The sorting ratios (percentages) and the branching amount, which have been specified, are reflected on information displayed in the output point 114 of the icon 102i.

The icon 102j represents a particle-size sorting process. The icon 102j also serves as a switch by which the corresponding model setting screen 230 (refer to FIG. 18) of the second layer is displayed. Here, for example, a threshold value of a particle diameter is set at 40 mm. Accordingly, the crushed wastes are sorted into: crushed wastes having a particle diameter of 40 mm or less; and crushed wastes having a particle diameter of 40 mm or more (displayed as the icon 103k). The crushed wastes having a particle diameter of 40 mm or more, which have been sorted in the particle-size sorting process, are returned to the crushing process, and are then crushed again. On the other hand, the crushed wastes having a particle diameter of 40 mm or less, which have been sorted in the particle-size sorting process, are sold or used as roadbed materials (displayed as the icon 103l).

The icon 102k represents a transportation process. The icon 102k also serves as a switch by which the corresponding model setting screen 220 (refer to FIG. 17) of the second layer is displayed. Here, the wastes (the icon 103b) sorted in the heavy-machine sorting process are transported to a final disposal site displayed as the icon 102l.

The above-described "Verify calculation input" button 117, which is always displayed on the layout creation screen 100, is an object that is manipulated to verify the settings made in the model setting screens 210 through 250 of the second layer. To be more specific, the settings include a model of a machine to be used in the system, the number of the machines, the operating time of the machine, and the travel distance of the machine. The "Verify calculation input" button 117 plays a role as a switch by which the condition list screen 180 (refer to FIG. 14) used to review current settings is displayed.

For information about the settings, sorting ratios of processed objects and the amount thereof are displayed in each of the icons 102 in the layout creation screen 100. However, information including a model of a machine to be used in each process, the number of the machines, and the operating time of the machine are set on the model setting screens 210 through 250 (described later) of the second layer. Although settings made on each model setting screen are not reflected on the layout creation screen 100, these settings made on the model setting screens 210 through 250 can be listed on the condition list screen 180.

Clicking the "Execute calculation" button 118, which is always displayed on the layout creation screen 100, causes the calculation result display screen 190 (refer to FIG. 15) to be displayed. Specified items (for example, the amount of $CO_2$ emission, and a processing price) are calculated on the basis of the settings inputted on each of the screens of the second layer, and on the basis of information about the fuel consumption and price on a model basis. The calculation result display screen 190 displays the result of the calculation. The amount of $CO_2$ emission is determined by calculating consumed energy from fuel consumption of a model of a machine used, the operating time of the machine, and the like, and then by making a calculation from a corresponding basic unit (specified data including the amount of $CO_2$ emission occurred when materials are consumed per unit quantity).

Next, an example of how to calculate the amount of $CO_2$ emission will be described.

In this example, on the assumptions that the consumed quantity (L/h) of fuel (light oil) consumed by a machine used is B, and that the amount of $CO_2$ emission per unit time caused by combustion of the light oil is C, the amount of $CO_2$ emission A can be estimated by the following equation (Equation 1):

$$A = B \times C \quad (1)$$

In addition, on the assumptions that the fuel consumption (L/h) per unit time of a machine used is D, and that the operating time of the machine used is E, the consumed quantity of fuel B can be calculated by the following equation:

$$B = D \times E \quad (2)$$

The above calculations are made based on (Equation 1) and (Equation 2). Accordingly, if a value of C on a fuel basis and a value of D on a model basis are provided beforehand, the amount of $CO_2$ emission per model specified is calculated by using the present tool to specify the total amount of objects to be processed and a model of a machine to be used, and then to input the operating time E. Therefore, if a model of a machine to be used, the operating time of the machine, and the number of the machines are inputted, the total amount of $CO_2$ emission of the whole system can be calculated.

Moreover, it is also thought that on the basis of the specified processed amount F (a value displayed in the processed-amount display field 115 of each icon 102), the operating time E of a model of a machine to be used is calculated by the following equation (Equation 3):

$$E = F/G \quad (3)$$

where G is a workload per unit time of the model of the machine to be used (preset value).

In this case, only specifying the model of the machine to be used by the present tool makes it possible to calculate the amount of $CO_2$ emission per machine corresponding to the model by use of (Equation 1) through (Equation 3). Therefore, if the model of the machine to be used and the number of the machines are inputted, the total amount of $CO_2$ emission of the whole system can be calculated.

Furthermore, in this example, costs required for the building and operation of the system are displayed together with environmental loads on the calculation result display screen 190 shown in FIG. 15. This is useful for carefully reviewing the system in consideration of a balance between the costs and the environmental loads.

Next, an example of how to calculate required costs will be described.

Although there are various kinds of required costs H to be calculated here, this example shows a case where cost H1 of consumed fuel of a machine used, and disposal cost H2 of wastes transported to a final disposal site, are calculated.

From the consumed quantity of fuel I (I is a total value of the consumed quantity of fuel B (on a machine basis) or a total value of the consumed quantity of fuel B of the whole system), and a unit fuel price J, the fuel cost H1 can be calculated by the following equation:

$$H1 = I \times J \quad (4)$$

Next, from the disposed quantity K and a unit disposal price L, the disposal cost H2 can be calculated by the following equation:

$$H2 = K \times L \quad (5)$$

The disposed quantity K is the total amount of wastes transported to the final disposal site 102*l*. To be more specific, the disposed quantity K is equivalent to a value displayed in the processed-amount display field 115 of the icon 102*k* on the layout creation screen 100 in FIG. 12. The unit disposal price L is a preset value. For example, data is prepared beforehand on a disposal site basis from a geographical point of view. Besides the above-described costs, costs of equipment including machine rental charges and machine purchase costs may also be calculated together.

Moreover, each of the condition list screen 180 (FIG. 14) and the calculation result display screen 190 (FIG. 15) has a button 170 in which "Return to the process screen" is displayed. The button 170 is used to return to the layout creation screen 100. Accordingly, clicking the button 170 causes the layout creation screen 100 to be displayed. A display area may also be separately allocated above the layout creation screen 100 so that the condition list screen 180 and/or the calculation result display screen 190 can be displayed in the display area.

(4-2) Description of Second Layer Screens

Next, second layer screens will be described below.

The model setting screens 210, 220, 230, 240, and 250 which are shown in FIG. 16 through FIG. 20 respectively belong to the second layer screens.

First, common parts of each of the second layer screens will be described. Each of the model setting screens 210 through 250 belonging to the second layer screen displays a button 170 that is used to return to the layout creation screen 100. Clicking the button 170 in each of the model setting screens 210 through 250 causes the layout creation screen 100 to be displayed. In addition, each of the model setting screens 210 through 250 is provided with: a used equipment field 280 used to specify a model of a machine to be used; and an input field 270 used to input the number of the machines to be used, the operating time of the machine, and the travel distance of the machine. Manipulating the used equipment field 280 causes model options to be displayed. The model of the machine to be used can be selected from the model options. The selected model name is then automatically displayed in a "selected model" field of the input field 270. Next, the model setting screens 210 through 250 of the second layer will be individually described below.

FIG. 16 illustrates the model setting screen 210 for the excavating and heavy-machine sorting processes. The model setting screen 210 is displayed when the icon 102a or the icon 102c is clicked on the layout creation screen 100.

Figure 21:
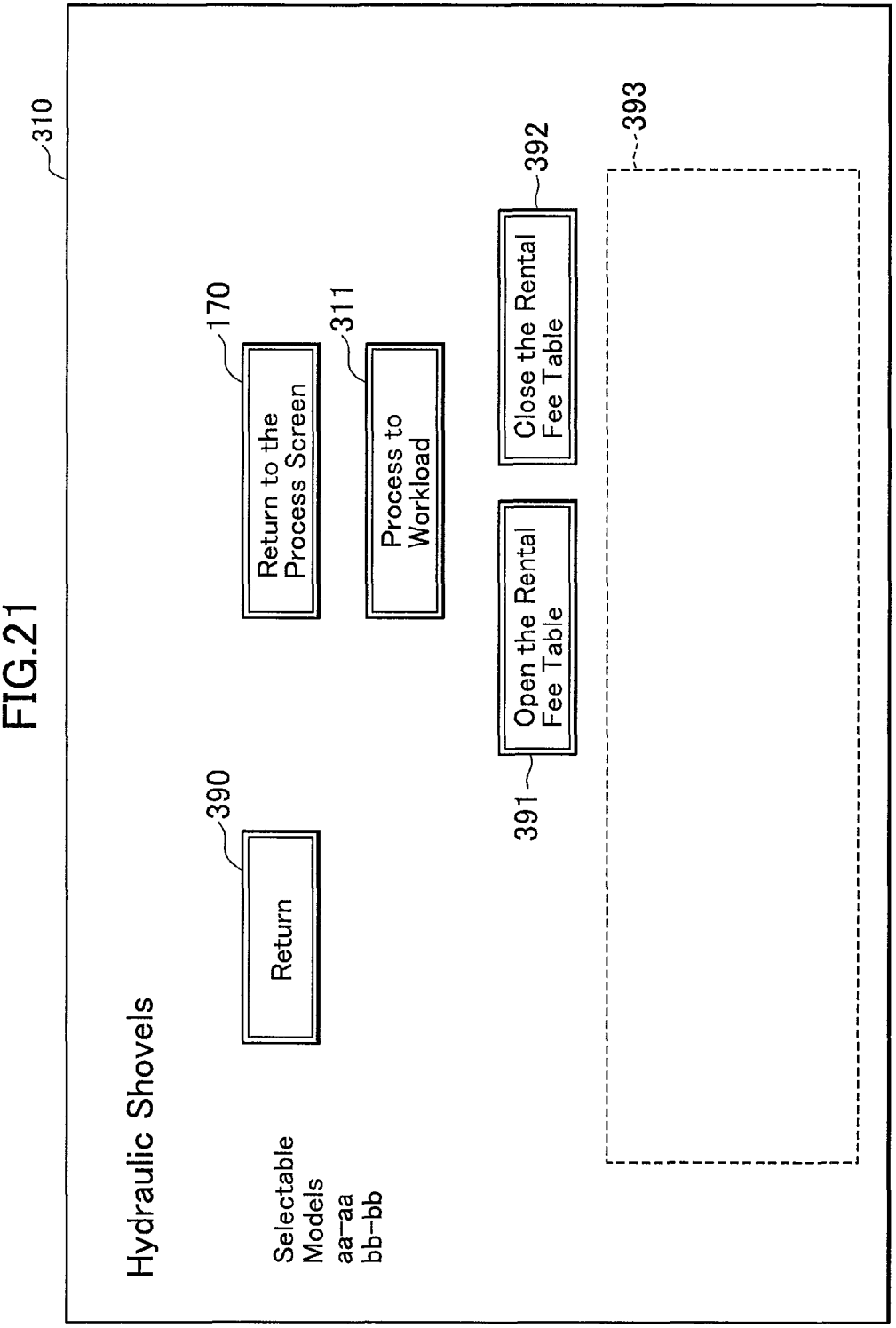
FIG. 21 is a diagram illustrating a machine-body information screen of the on-site system building support tool according to one embodiment of the present invention.

On the model setting screen 210 shown in FIG. 16, a model of a hydraulic shovel for excavating, that of a hydraulic shovel for sorting, that of a transportation trailer, and that of a truck for field operation are selected from the used model fields 280. The number of machines (set), the operating time (h), and the travel distance (km) are then inputted into the input fields 270 on a selected specification model basis. In addition, the model setting screen 210 is provided with buttons 211 through 213, each of which is used to display a corresponding third layer screen. Clicking the button 211 indicating "Proceed to hydraulic shovels" causes a machine body information screen 310 (FIG. 21) of the third layer to be displayed. The machine body information screen 310 displays machine body information of a hydraulic shovel. Clicking the button 212 indicating "Proceed to trailers" causes a machine body information screen 370 (FIG. 27) of the third layer to be displayed. The machine body information screen 370 displays machine body information of a trailer. Clicking the button 213 indicating "Proceed to trucks" causes a machine body information screen 360 (FIG. 26) of the third layer to be displayed. The machine body information screen 360 displays machine body information of a truck. Thus, when a model of a machine to be used is selected, if reference information is needed, clicking each of the buttons 211 through 213 displays a correspondence screen belonging to the third layer screens.

FIG. 17 illustrates the model setting screen 220 for the transportation process. The model setting screen 220 is displayed when the icon 102b is clicked on the layout creation screen 100.

On the model setting screen 220 shown in FIG. 17, a model of a truck for field operation, and that of a truck for transportation to a disposal site, are selected from the used model fields 280. The number of machines (set), the operating time (h), and the travel distance (km) are then inputted into the input fields 270 on a selected specification model basis. In addition, the model setting screen 220 is provided with a button 221 that is used to display a corresponding third layer screen. Clicking the button 221 indicating "Proceed to trucks" causes a machine body information screen 360 (FIG. 26) of the third layer to be displayed. The machine body information screen 360 displays machine body information of a truck.

Figure 18:
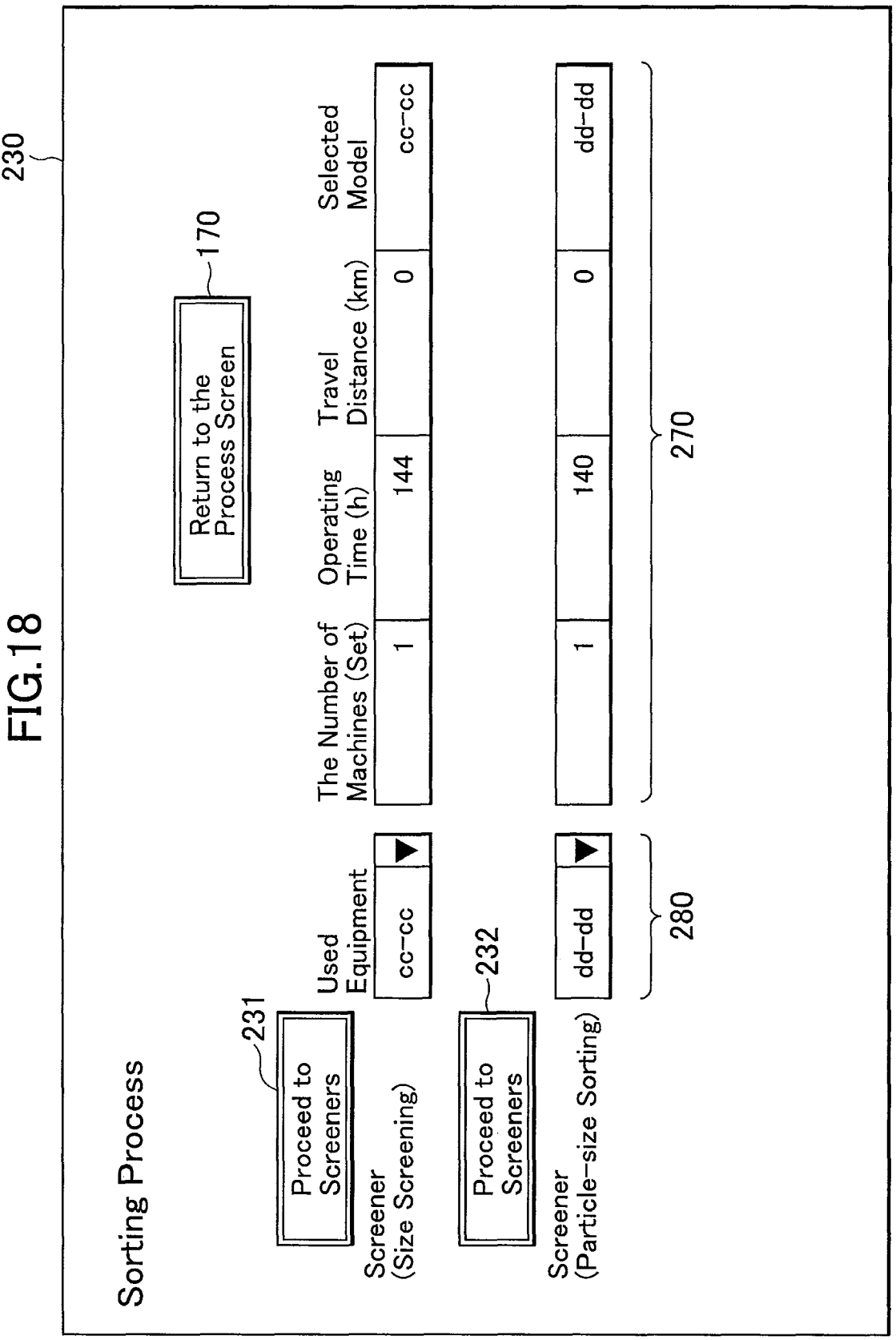
FIG. 18 is a diagram illustrating a model setting screen of the on-site system building support tool according to one embodiment of the present invention.

FIG. 18 illustrates the model setting screen 230 for the sorting process. The model setting screen 230 is displayed when the icon 102d or the icon 102j is clicked on the layout creation screen 100.

Figure 22:
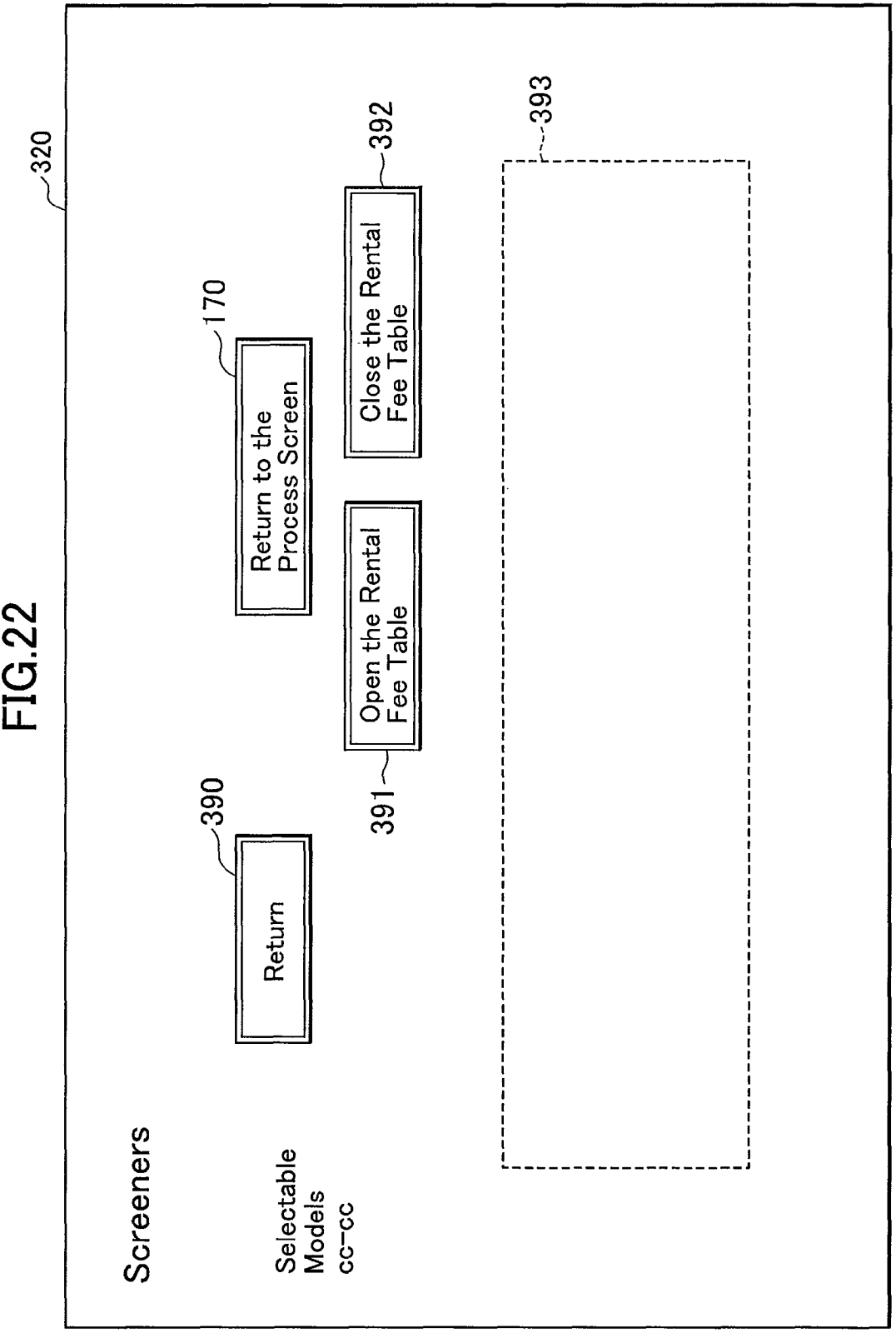
FIG. 22 is a diagram illustrating a machine-body information screen of the on-site system building support tool according to one embodiment of the present invention.
Figure 24:
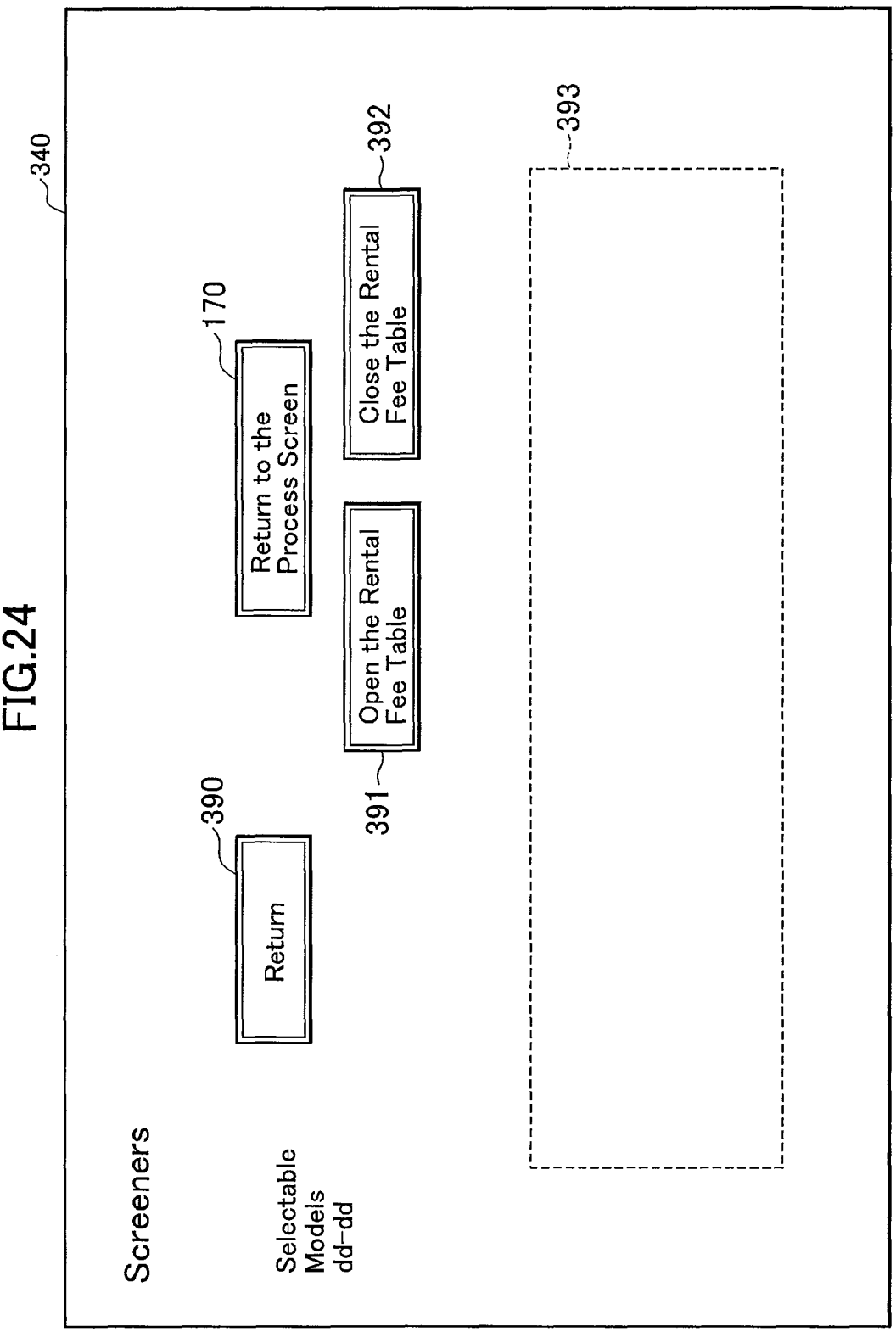
FIG. 24 is a diagram illustrating a machine-body information screen of the on-site system building support tool according to one embodiment of the present invention.

On the model setting screen 230 shown in FIG. 18, a model of a machine for size screening, and a model of a machine for particle-size sorting, are selected from the used model fields 280 (for example, a screener is selected). The number of machines (set), the operating time (h), and the travel distance (km) are then inputted into the input fields 270 on a selected specification model basis. In addition, the model setting screen 230 is provided with buttons 231 and 232, each of which is used to display a corresponding third layer screen. Clicking the button 231 indicating "Proceed to screeners" causes a machine body information screen 320 (FIG. 22) of the third layer to be displayed. The machine body information screen 320 displays machine body information of a screener that is suitable for size screening. In a similar manner, clicking the button 232 indicating "Proceed to screeners" causes a machine body information screen 340 (FIG. 24) of the third layer to be displayed. The machine body information screen 340 displays machine body information of a screener that is suitable for particle-size sorting.

Figure 19:
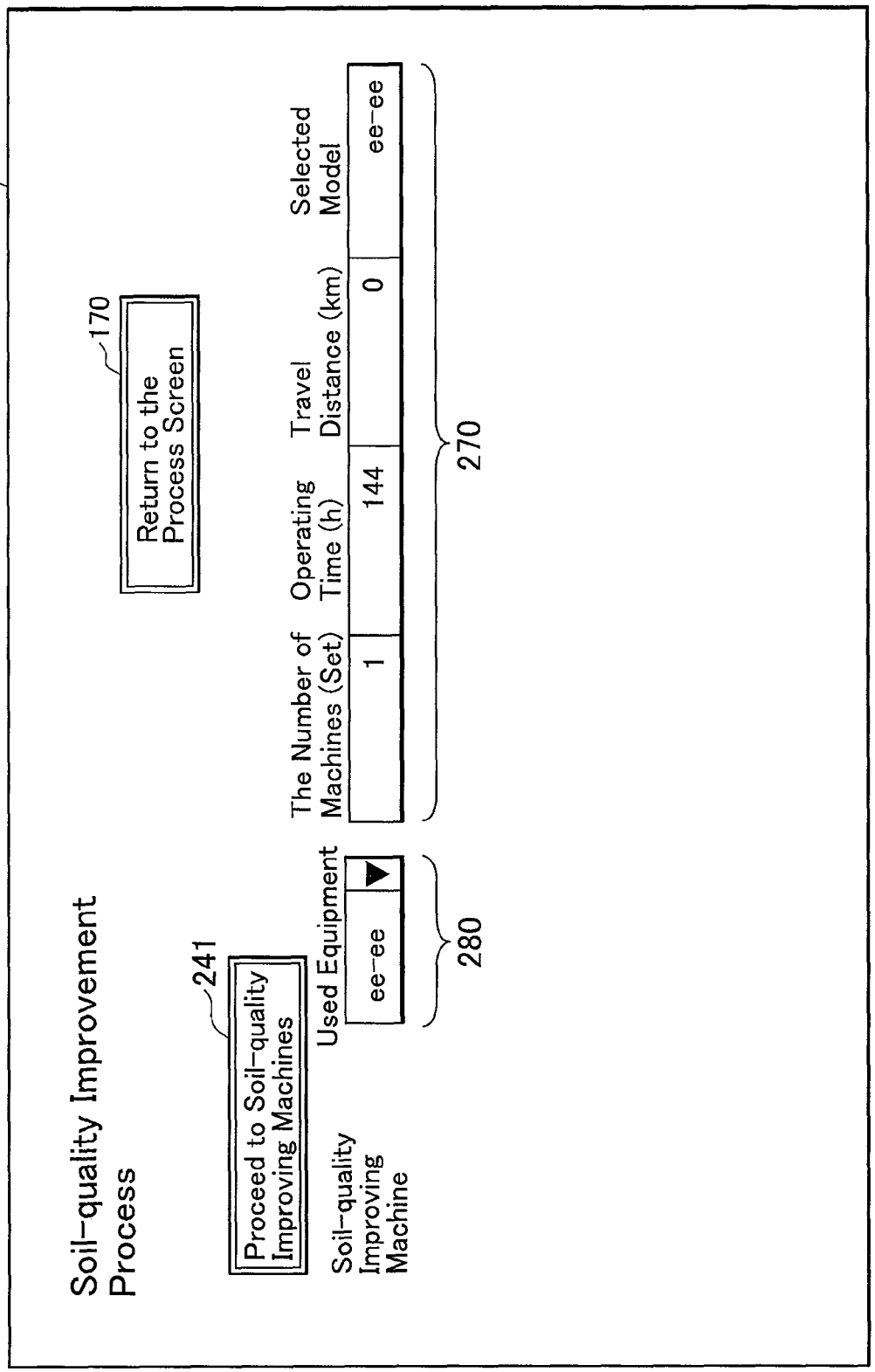
FIG. 19 is a diagram illustrating a model setting screen of the on-site system building support tool according to one embodiment of the present invention.

FIG. 19 illustrates the model setting screen 240 for the soil-quality improvement process. The model setting screen 240 is displayed when the icon 102e is clicked on the layout creation screen 100.

Figure 25:
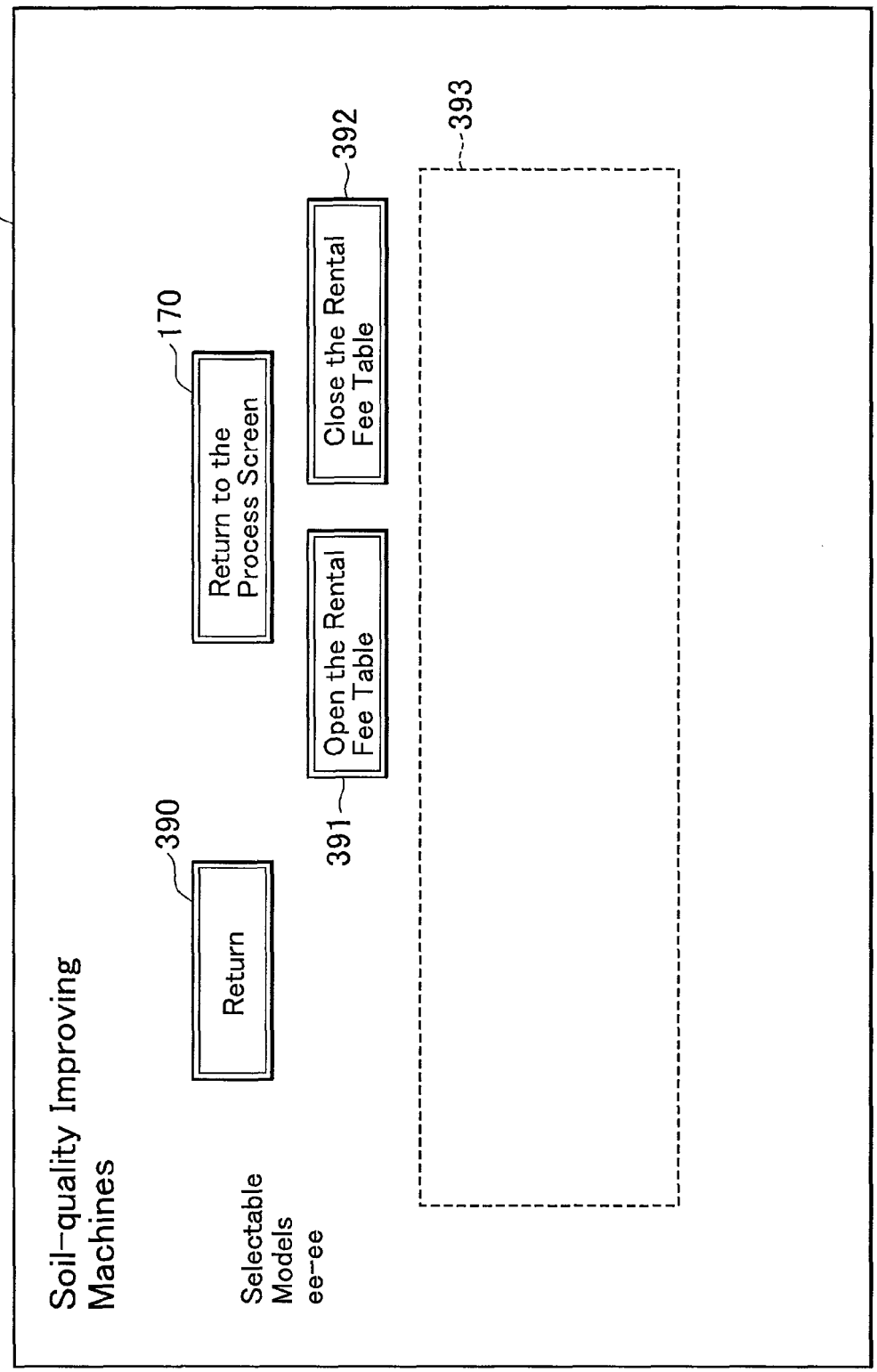
FIG. 25 is a diagram illustrating a machine-body information screen of the on-site system building support tool according to one embodiment of the present invention.

On the model setting screen 240 shown in FIG. 19, a model of a soil-quality improving machine is selected from the used model field 280. The number of machines (set), the operating time (h), and the travel distance (km) are then inputted into the input fields 270 on a selected specification model basis. In addition, the model setting screen 240 is provided with a button 241 that is used to display a corresponding third layer screen. Clicking the button 241 indicating "Proceed to soil-quality improving machines" causes a machine body information screen 350 (FIG. 25) of the third layer to be displayed. The machine body information screen 350 displays machine body information of a soil-quality improving machine.

Figure 20:
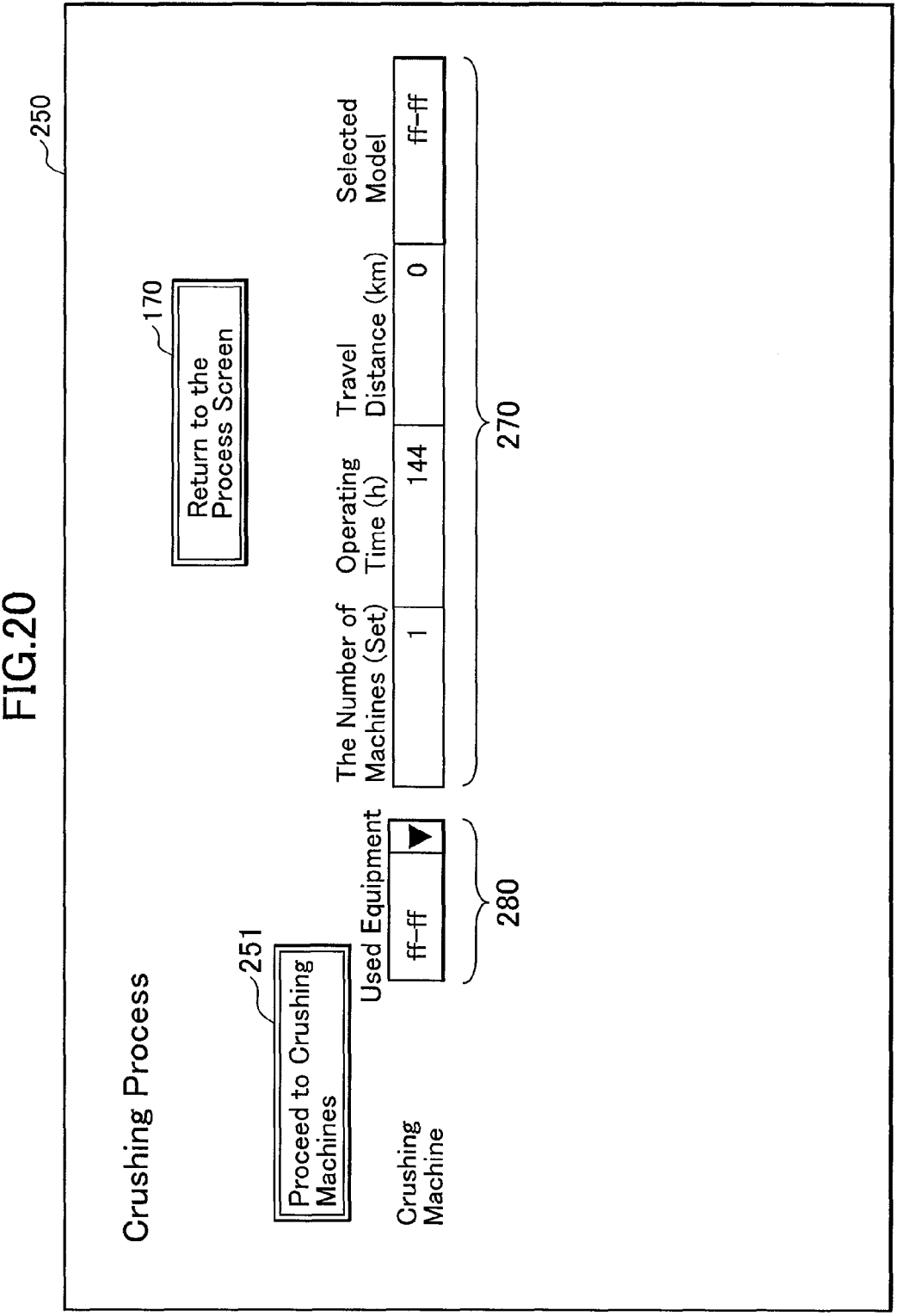
FIG. 20 is a diagram illustrating a model setting screen of the on-site system building support tool according to one embodiment of the present invention.

FIG. 20 illustrates the model setting screen 250 for the crushing process. The model setting screen 250 is displayed when the icon 102i is clicked on the layout creation screen 100.

Figure 23:
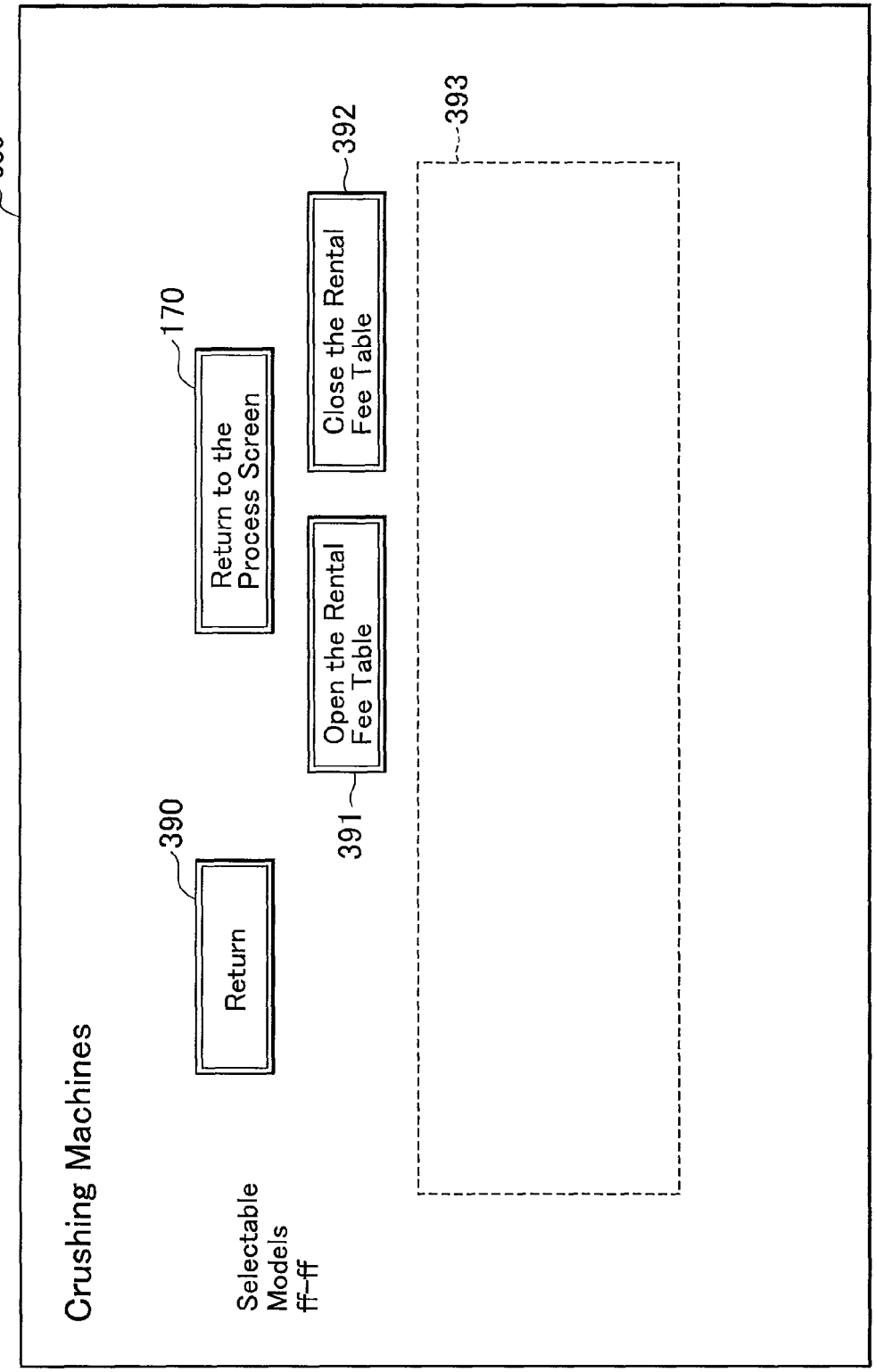
FIG. 23 is a diagram illustrating a machine-body information screen of the on-site system building support tool according to one embodiment of the present invention.

On the model setting screen 250 shown in FIG. 20, a model of a crushing machine is selected from the used model field 280. The number of machines (set), the operating time (h), and the travel distance (km) are then inputted into the input fields 270 on a selected specification model basis. In addition, the model setting screen 250 is provided with a button 251 that is used to display a corresponding third layer screen. Clicking the button 251 indicating "Proceed to crushing machines" causes a machine body information screen 330 (FIG. 23) of the third layer to be displayed. The machine body information screen 330 displays machine body information of a crushing machine.

As described above, a model of a machine to be used for each process, the number of the machines, the operating time of the machine, and the travel distance of the machine, all of which have been specified on the model setting screens 210 through 250 belonging to the second layer screens, can be listed on the condition list screen 180. Clicking the "Verify calculation input" button 117 of the layout creation screen 100 displays the condition list screen 180.

(4-3) Description of Third Layer Screens

Next, third layer screens will be described below.

The machine body information screens 310, 320, 330, 340, 350, 360, and 370, which are shown in FIGS. 21 through 27 respectively, are screens that are linked to the model setting screens 210 through 250 of the second layer as needed.

As shown in FIGS. 21 through 27, these machine body information screens belonging to the third layer screens are screens, each of which is used to view reference data, and each of which is displayed when a button indicating "Proceed to xxx" (for example, the button 241 shown in FIG. 19) is clicked on a linked model setting screen of the second layer. Each of the machine body information screens 310 through 370 belonging to the third layer screens has the button 170 used to return to the layout creation screen 100, and the button 390 used to return to a previously displayed second layer screen.

Figure 26:
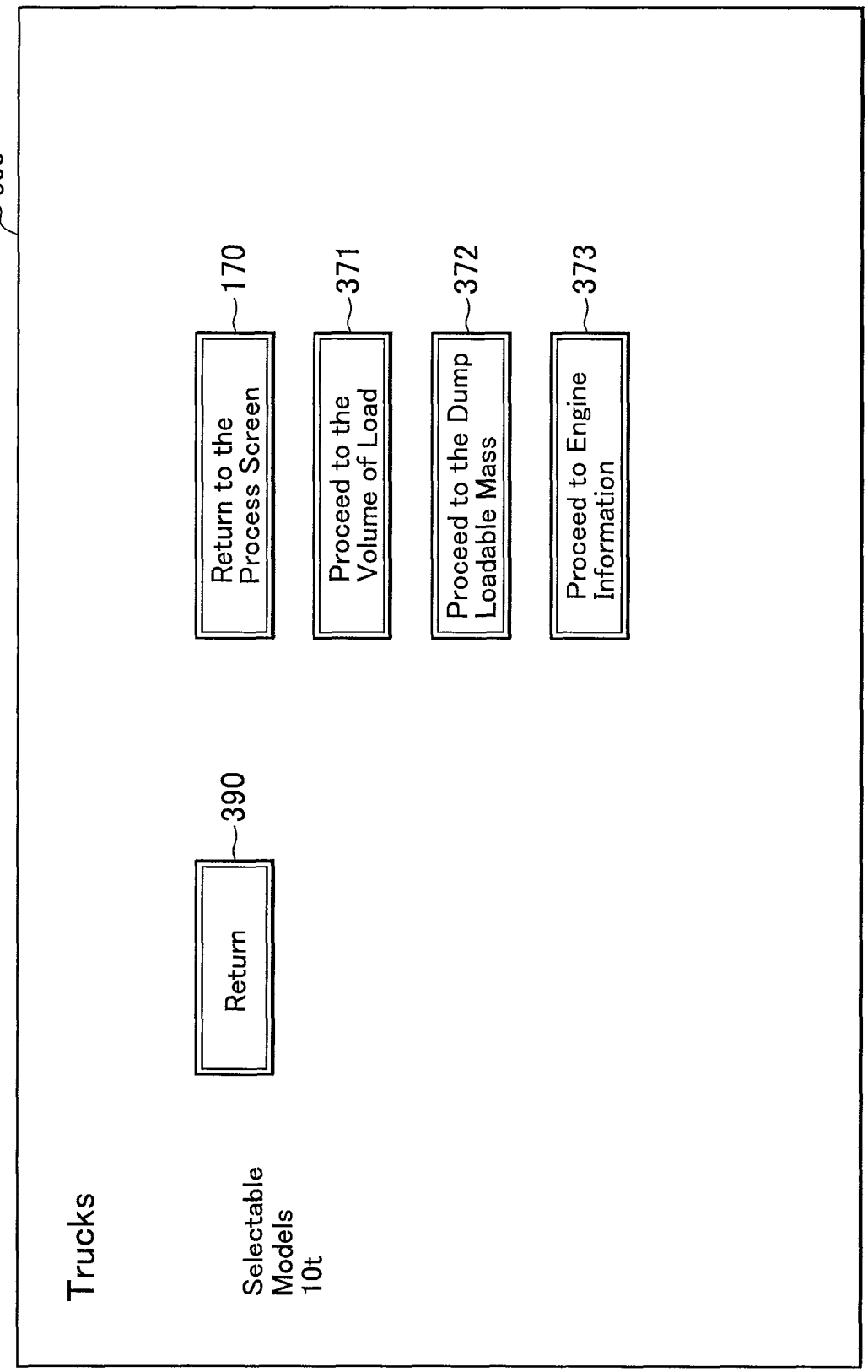
FIG. 26 is a diagram illustrating a machine-body information screen of the on-site system building support tool according to one embodiment of the present invention.
Figure 27:
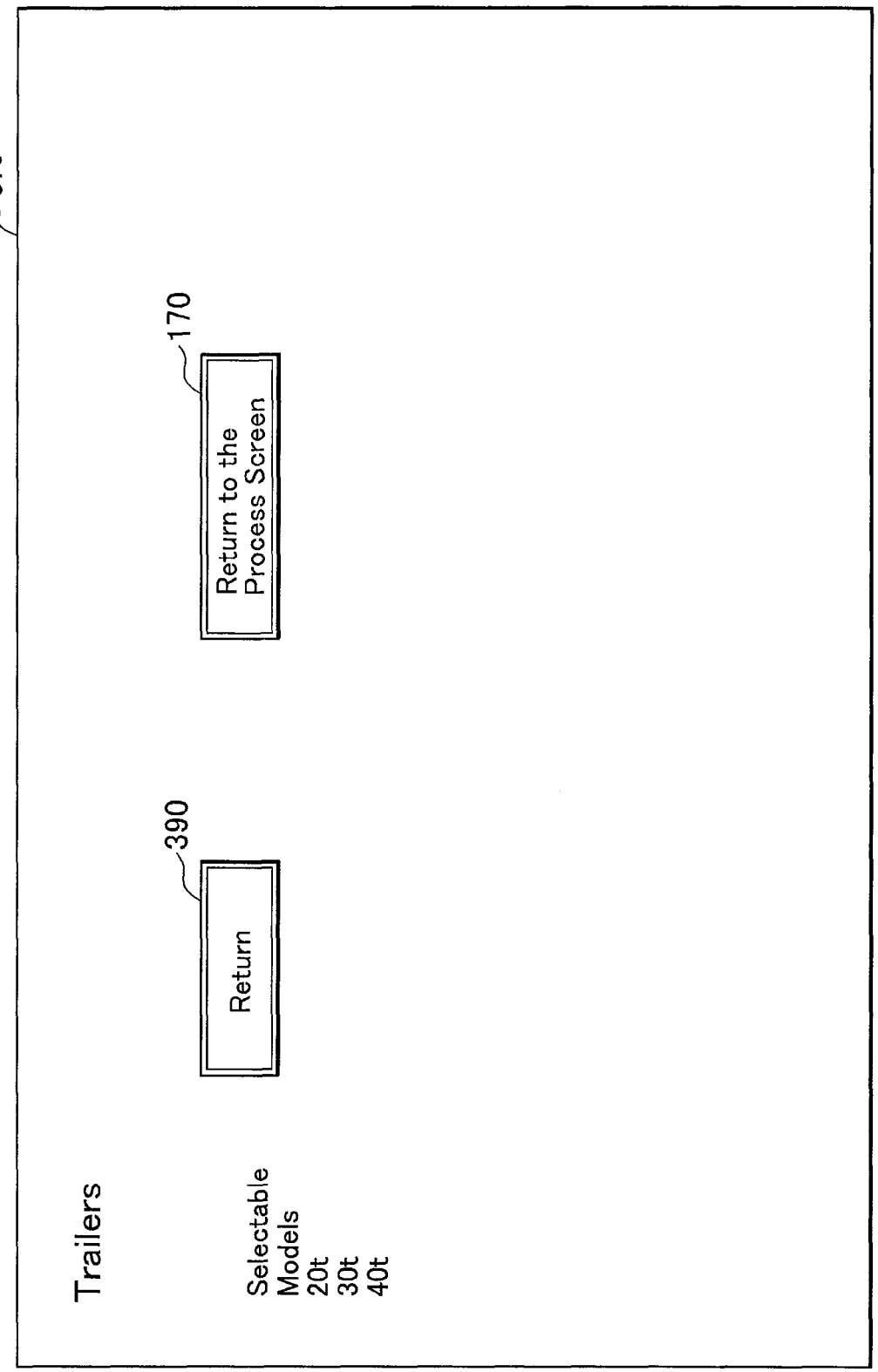
FIG. 27 is a diagram illustrating a machine-body information screen of the on-site system building support tool according to one embodiment of the present invention.

For example, the machine body information screen 360 shown in FIG. 26 is displayed by clicking the button 213 on the model setting screen 210 (FIG. 16) or by clicking the button 221 on the model setting screen 220 (FIG. 17). Thus, when a third layer screen which is called from a plurality of model setting screens of the second layer is displayed, it is not possible to return to a previously displayed second layer screen from which the third layer screen is called unless information about the previously displayed second layer screen is stored. Therefore, a machine body information screen of the third layer is called and displayed from a model setting screen of the second layer with a display history written to, for example, a memory. When the "Return" button 390 is clicked, the history is referred to so as to return to the model setting screen of the second layer from which the machine body information screen of the third layer has been called.

In addition, for example, each of a machine-body information screen 310 for hydraulic shovels (FIG. 21), machine-body information screens 320 and 340 for screeners (FIGS. 22 and 24), a machine-body information screen 330 for crushing machines (FIG. 23), and a machine-body information screen 350 for soil-quality improving machines (FIG. 25), all of which belong to the third layer screens, are provided with a button 391 indicating "Open the rental fee table", and a button 392 indicating "Close the rental fee table".

When the button 391 is clicked, an information field 393 is displayed on each machine-body information screen. The information field 393 displays various kinds of information about a model listed on a machine-body information screen corresponding to the button 391. The information field 393 displays stored information about a model listed on each machine-body information screen. The information includes: output; mass; a price; the standard number of years of use; the annual standard operating time; the number of days of operation; the number of days of shared use; a maintenance repair ratio; an annual repair ratio; a residual ratio; a rental fee rate per one hour operation; a rental fee; a rental fee rate per one day shared use; a rental fee; a fuel cost; oils and fats; an operating labor cost; and the total amount of operating costs. Clicking the button 392 causes the information field 393 to enter an invisible state. The machine body data, which is stored as the information displayed in the information field 393, is also used for calculation whose result is displayed on the calculation result display screen 190 (FIG. 15).

Incidentally, the information to be displayed in the display field 393 as the machine body data may also include: the machine body size; a kind and rated output of an engine; a method of a processing unit and the size thereof; the travelling speed; the climbing ability; a drive system; the capacity of a fuel tank and that of a hydraulic fluid tank; and the fuel efficiency. Part of the above information can also be viewed as part of technical information on a screen of a fourth layer described below. The link relationship between screens, and kinds of information to be displayed on the screens, can be changed in various ways.

Further, the machine-body information screen 310 (FIG. 21) is provided with a button 311; and the machine-body information screen 360 (FIG. 26) is provided with buttons 371 through 373. Each of the buttons 311, 371, 372, and 373 is used to proceed to a technical information screen belonging to the fourth layer screens.

(4-4) Description of Fourth Layer Screens

The fourth layer screens will be described below.

Technical information screens 410, 420, 430, and 440, which belong to the fourth layer screens, are illustrated in FIG. 28 through 31 respectively. Each of the technical information screens 410, 420, 430, and 440 displays technical data that is called from the machine-body information screen 310 or 360 belonging to the third layer screen. What is positioned on the technical information screens 410 through 440 in common is only a button 390 displaying "Return". Clicking this button 390 displays the previously displayed machine-body information screen 310 or 360 of the third layer, the same as when the button 390 of the third layer is clicked.

For example, the technical information screen 410 shown in FIG. 28 is a screen that is displayed by clicking the button 371 indicating "Proceed to the volume of load" on the machine-body information screen 360 for a truck shown in FIG. 26. The technical information screen 410 shows technical information including, for example, a load whose volume is converted to the number of trucks. In this case, the load is shown on a kind basis. The technical information screen 420 shown in FIG. 29 is a screen that is displayed by clicking the button 372 indicating "Proceed to the dump loadable mass" on the machine-body information screen 360. The technical information screen 420 shows technical information including the loading capacity of a truck. The technical information screen 430 shown in FIG. 30 is a screen that is displayed by clicking the button 373 indicating "Proceed to engine information" on the machine-body information screen 360. The technical information screen 430 shows technical information about various kinds of engines or electric generators built into a truck; more specifically, the technical information about the engines or the electric generators includes the output, the amount of NOx emission, a fuel consumption rate, and the fuel consumption. The technical information screen 440 shown in FIG. 31 is a screen that is displayed by clicking the button 311 indicating "Proceed to workload" on the machine-body information screen 310 for hydraulic shovels shown in FIG. 21. The technical information screen 440 shows technical information about performance of a candidate hydraulic shovel; more specifically, the technical information includes a workload per unit time, the bucket capacity, a bucket coefficient, working efficiency, the basic cycle time, and a coefficient between rotating angle and excavating depth.

Figure 32:
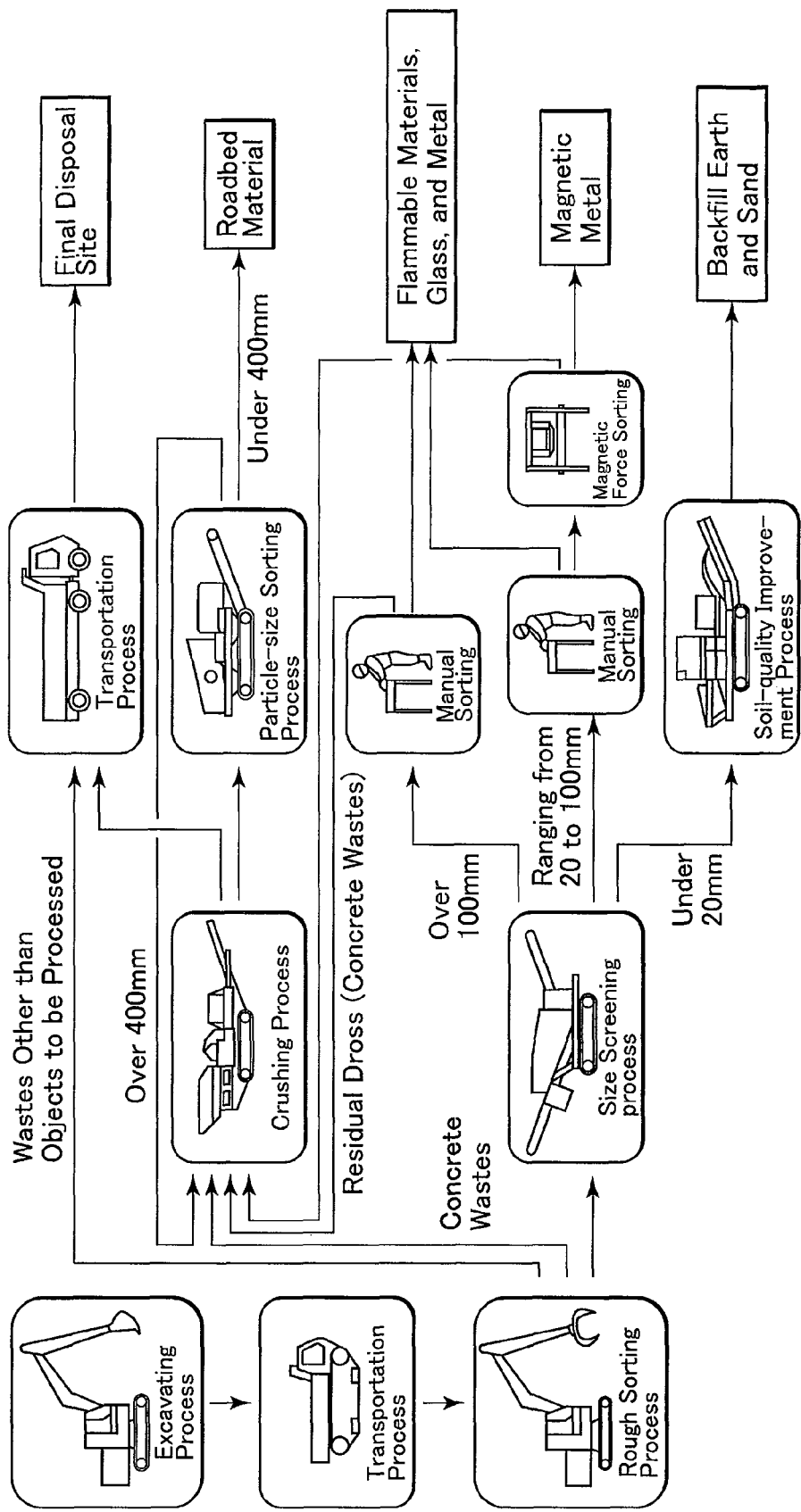
FIG. 32 is a system flowchart illustrating an on-site system simulated by the on-site system building support tool according to one embodiment of the present invention.
Figure 33:
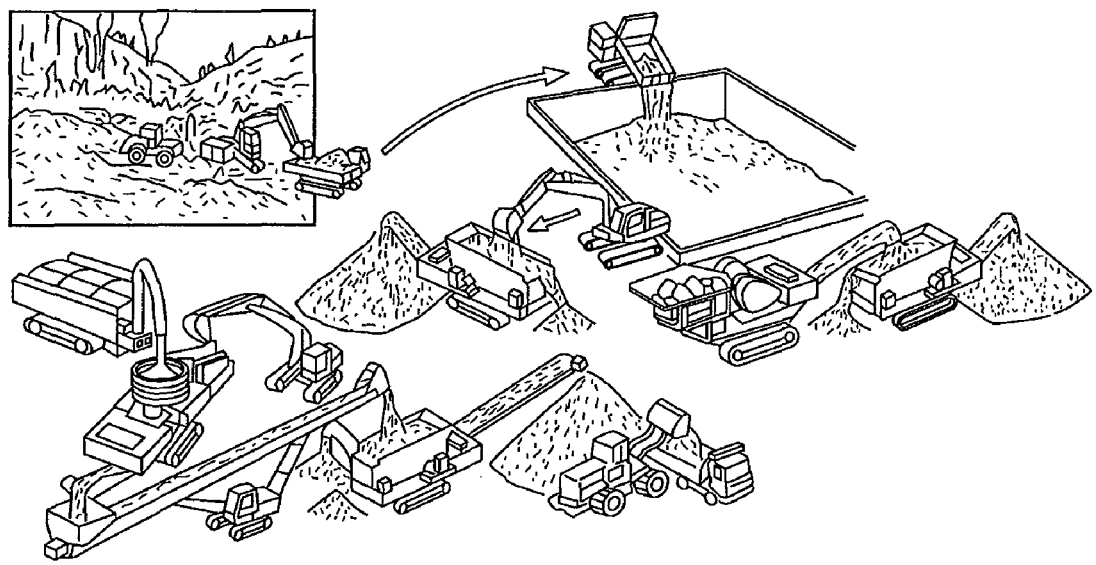
FIG. 33 is a graphical illustration showing how an on-site system simulated by the on-site system building support tool is implemented into a site according to one embodiment of the present invention.

As described above, a final virtual on-site system is built by repeating, as needed, the following steps: building flow of the on-site system on the layout creation screen 100 of the highest-level layer; inputting information including a model of a machine to be used, the number of the machines, and the operating time of the machine on the model setting screen of the second layer; referring to information displayed on the machine-body information screen of the third layer, and that displayed on the technical information screen of the fourth layer; and checking information displayed on the condition list screen 180 and on the calculation result display screen 190. FIG. 32 is a diagram illustrating an example of the flow of the on-site system built by the above-described operation. FIG. 33 is a graphical illustration showing an on-site system that is implemented into an actual site on the basis of the on-site system virtually built by the present tool.

(5) Hardware Description

Figure 34:
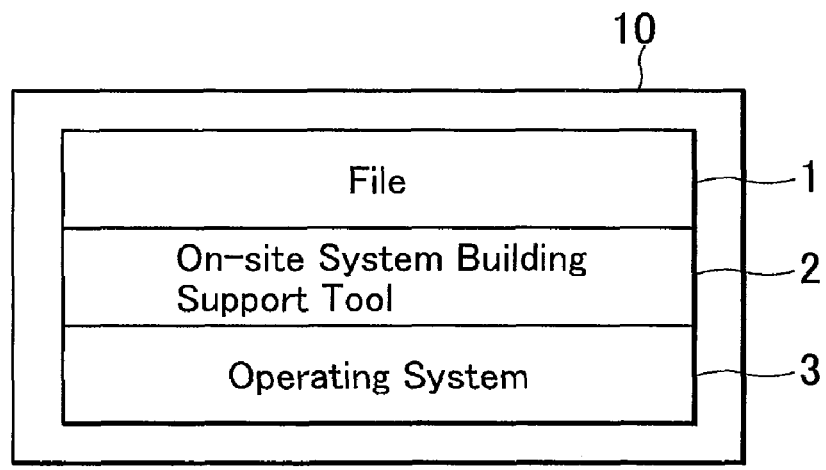
FIG. 34 is a conceptual diagram illustrating an example of a terminal that is used to execute an on-site system building support tool according to one embodiment of the present invention.

FIG. 34 is a conceptual diagram illustrating an example of a terminal (an on-site system building support apparatus) for executing an on-site system building support tool according to the present invention.

As shown in FIG. 34, a file 1 operates in an on-site system building support tool (the present tool) 2. A file name of the file 1 is specified on a initial setting screen 110 before the file 1 is stored. A terminal 10 used by a user, and the like, is installed with an operating system (OS) 3 for operating the present tool 2. The present tool 2 is a program that complies with an operational environment of the OS 3, and accordingly operates on the OS 3. Various kinds of terminals each having a calculation function and a display function (for example, personal computers (both desktop and notebook personal computers can be used), PDAs (Personal Digital Assistants), tablet PCs, and mobile phones) can be used as the terminal 10.

Figure 35:
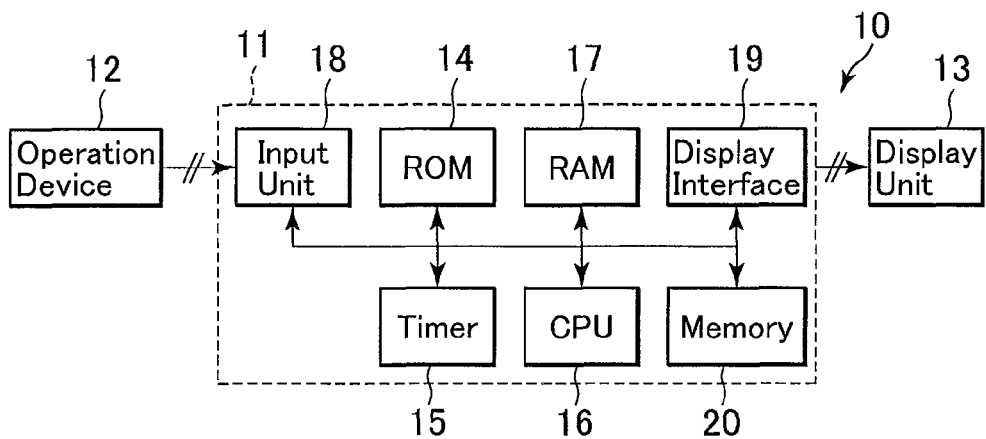
FIG. 35 is a block diagram illustrating a functional configuration of a terminal that is used to execute an on-site system building support tool according to one embodiment of the present invention.

FIG. 35 is a block diagram illustrating a functional configuration of the terminal 10.

Referring to FIG. 35, the terminal 10 includes: a terminal main body 11; an operation device 12 through which input operation to the terminal main body 11 is performed; and a display unit 13 for displaying a screen based on a display signal that is output from the terminal main body 11 according to the input through the operation device 12.

The terminal main body 11 includes: a ROM (read-only memory) 14 for storing a specified program and constants, which are required for computation; a timer 15 for measuring the time; a CPU (central processing unit) 16 that functions as computing means for executing various kinds of computation; a RAM (random-access memory) 17 that functions as temporary storing means for temporarily storing the result of the computation by the CPU 16, and temporary numerical values that are being calculated by the CPU 16; an input unit 18 for inputting an operation signal from the operation device 12; a display interface 19 for outputting a display signal calculated by the CPU 16 to the display unit 13; and a memory (for example, a hard disk) 20 in which the present tool 2 and the OS 3 are stored. The file 1 may be stored in the memory 20, and may also be stored in an external memory such as a flexible disk.

The operation device 12 varies depending on a kind of the terminal 10. The operation device 12 may include the whole range of input devices including: buttons used for inputting characters, which are typified by, for example, a keyboard; and pointing devices typified by, for example, a mouse, a touch pen, and a track ball. If the display unit 13 has a touch-panel function, a touch panel thereof is also included in the operation device 12.

Figure 36:
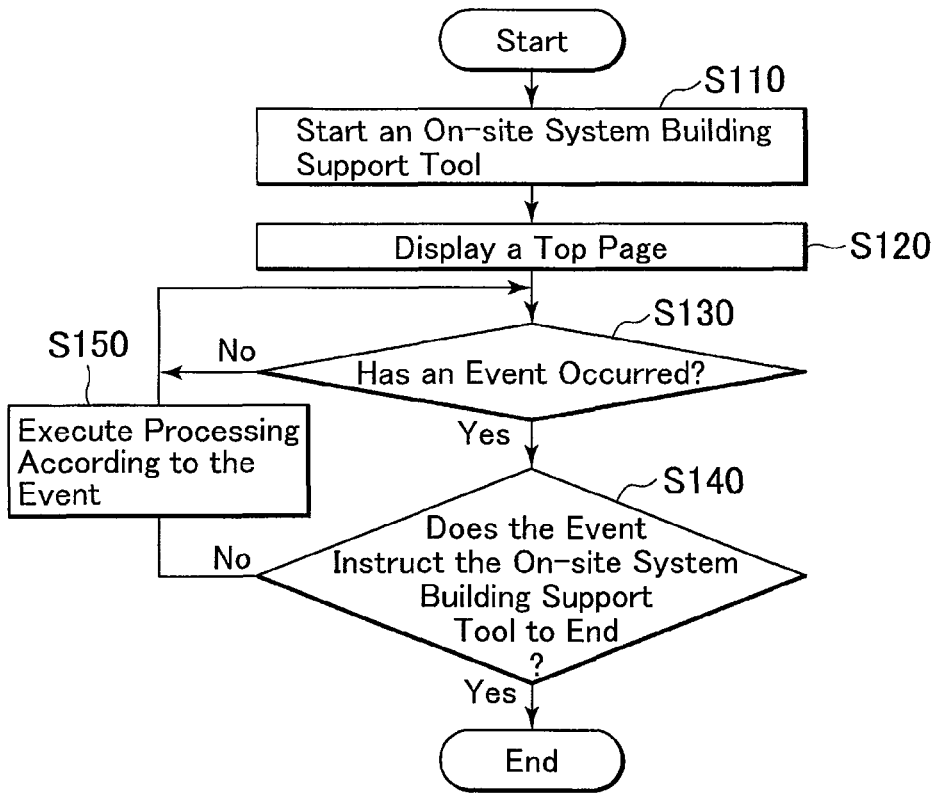
FIG. 36 is a flowchart illustrating steps of the on-site system building support tool executed by the terminal according to one embodiment of the present invention.

FIG. 36 is a flowchart illustrating processing steps executed by the CPU 16 when the present tool 2 is executed on the terminal 10.

Referring to FIG. 36, when a user uses the operation device 12 to instruct the present tool 2 to start up, an operation signal is inputted into the terminal main body 11 through the input unit 18. As a result, the CPU 16 starts the present tool 2 in a step 110, and then outputs a display signal to the display unit 13 according to the present tool 2 in a subsequent step 120 so that the layout creation screen 100 shown in FIG. 1 is displayed on the display unit 13.

After the layout creation screen 100 is displayed on the display unit 13, the CPU 16 makes a judgment in a step 130 as to whether or not an operation signal has been received from the operation device 12 (more specifically, whether or not an event has occurred). If it is judged that no event has occurred (in other words, if the judgment in the step 130 is not satisfied), the CPU 16 returns the process to the step 130. If the operation device 12 is manipulated so that an event occurs, the judgment in the step 130 is satisfied. As a result, the CPU 16 advances the process to a step 140.

In the step 140, a judgment is made as to whether or not the inputted event instructs the present tool 2 to end. If it is judged that the event does not instruct the present tool 2 to end, the CPU 16 causes the process to proceed to a step 150, and then executes processing according to acquired event information in the step 150. After the processing is executed, the CPU 16 returns the process to the step 130. On the other hand, if it is judged that the event instructs the present tool 2 to end, the CPU 16 ends the present tool 2 to end the processing steps shown in FIG. 36.

Figure 37:
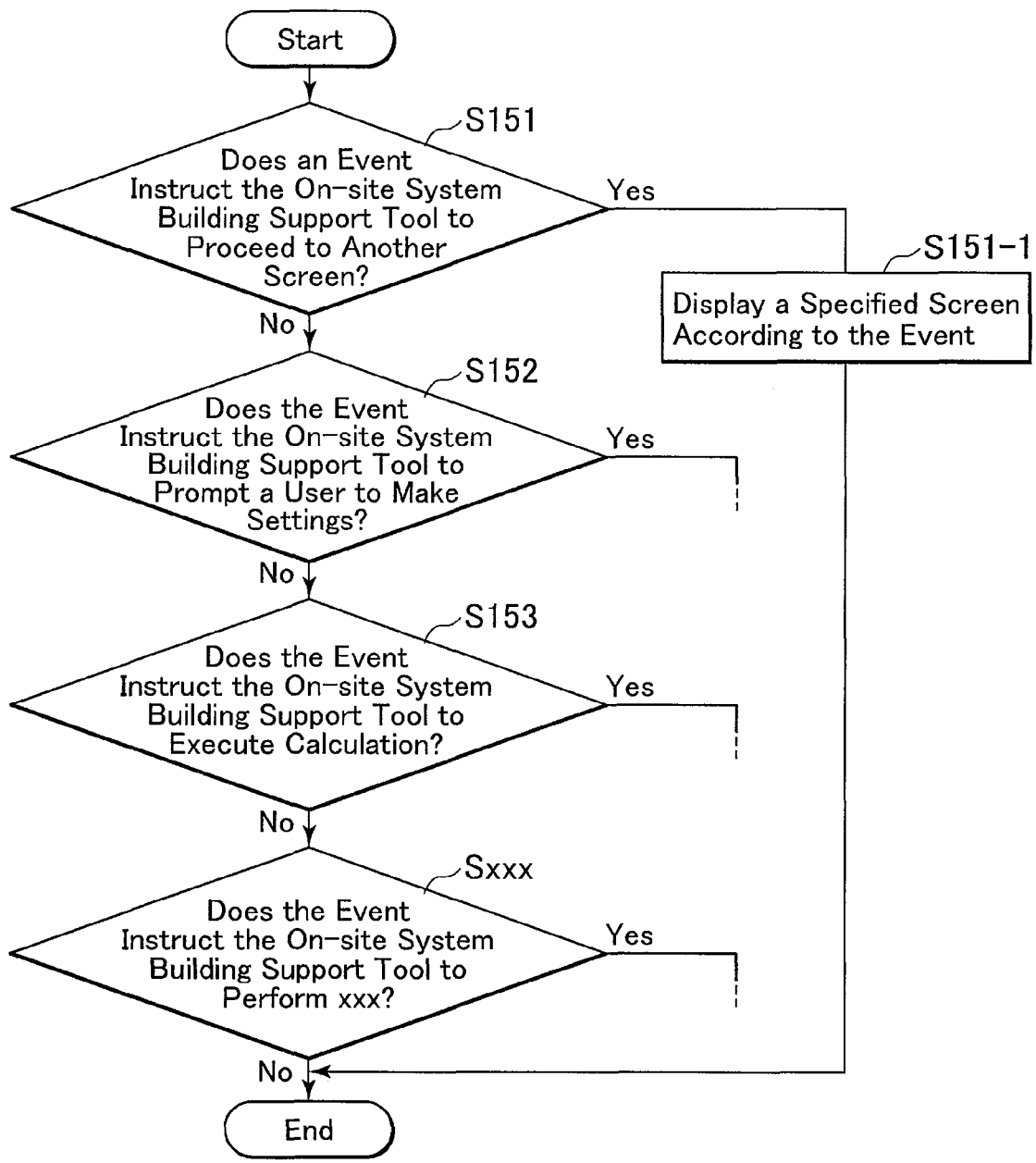
FIG. 37 is a flowchart illustrating steps of the on-site system building support tool executed by the terminal according to one embodiment of the present invention.

FIG. 37 is a flowchart specifically illustrating processing of the step 150 that the CPU 16 executes based on the instruction from the present tool 2.

In a step 150, the present tool 2 instructs the CPU 16 to identify a kind of operation instructed by the event whose input has been checked in the step 130 as shown in steps 151, 152, 153 and more. An event (operation signal), which is inputted from the operation device 12 through GUI operation by the interface of the present tool 2 (shown in each screen of each layer), and through the operation of a keyboard included in the operation device 12, instructs various kinds of operation including: reading the file 1; instructing "proceeding to another screen", which switches, for example, from a current display screen to a screen to which the current display screen links; positioning, moving, and deleting the icons 102 and 103, and changing various kinds of displaying of the icon 102 and 103; operating the output point 114; drawing, and deleting the association line 120; inputting data into an input field 270 in each of the model setting screens 210 through 250 of the second layer; selecting a model to be used in the used equipment field 280; displaying the condition list screen 180 by clicking the "Verify calculation input" button 117; executing calculation, and displaying the calculation result display screen 190, by clicking the "Execute calculation" button 118; and executing the operation by clicking each of the buttons 106 through 109 in the menu area 105.

Referring to FIG. 37, for example, if a case where an inputted event instructs "proceeding to another screen" is described as a typified example, the judgment in the step 151, in which a judgment is made as to whether or not an event instructs "proceeding to another screen", is satisfied. Accordingly, the CPU 16 causes the process to proceed to a step 151-1.

When the process proceeds to the step 151-1, the CPU 16 outputs, to the display unit 13, a display signal for displaying a screen (a linked-to screen) that is associated with the icons and buttons manipulated according to the present tool 2. Consequently, the linked-to screen is displayed. When the processing in the step 151-1 ends, the CPU 16 ends the step 150 shown in FIG. 37, and then returns the process to the step 130 shown in FIG. 36.

FIG. 37 shows the case where the inputted event instructs the function of "proceeding to another screen". However, for example, if the event instructs a function of inputting settings, the judgment in the step 151 is not satisfied. The CPU 16, therefore, advances the process to a step 152. Next, when the process is advanced to the step 152, a judgment in the step 152 is satisfied. The CPU 16 then stores settings in the RAM 17, and reflects the settings on associated data to display the settings together with the associated data. After that, the process returns to the step 130. To be more specific, on the occurrence of an event, the CPU 16 successively makes a judgment in the steps 151, 152, and more until a judgment is satisfied in a step corresponding to the event. Next, the CPU 16 executes processing according to the event, and then returns the process to the step 130. Until an event instructing the present tool 2 to end occurs, the series of processing (the steps 130 through 150) are repeatedly executed.

(6) Effects

The on-site system building support tool according to the above embodiment enables a user to optionally build the flow of an on-site system on the canvas area 101, and to specify, as needed, a model of a machine to be used in each process, and the like. This makes it possible to flexibly review the building of the on-site system in response to various circumstances including: the location of a site into which the onsite-system is to be implemented, and the area of the site; properties of objects to be processed, and the amount of the objects; and economic conditions of a customer. In addition, when the on-site system is actually built as assumed on the screens, a load of the on-site system applied to environment, and required costs, can be estimated one by one by simulation. Therefore, not only a configuration of the whole on-site system but also an environmental load of the on-site system to be built, the capability of the on-site system, and a balance between effects and costs, and the like, can be specifically grasped with ease. The on-site system building support tool, therefore, is extremely useful for prior review of implementation planning of the on-site system to be actually implemented into a site, as illustrated in FIG. 32. Accordingly, the on-site system building support tool helps a customer properly judge effects produced by implementing the on-site system, and helps the customer ensure that the on-site system is suitable for various circumstances including various expenses, an environmental load, and a work period.

On-site systems including waste disposal systems handle various kinds of objects to be processed. The amount of objects processed by the on-site systems also extremely varies. Circumstances surrounding each on-site system also differ for each site. A configuration of each on-site system, therefore, largely depends on what is targeted, and on a point to which importance is attached. A configuration of each on-site system differs depending on items to which importance is attached. For example, a system configuration differs depending on: costs required by the on-site system when a higher priority is placed on a work period; the capability of the on-site system, which can be achieved when a higher priority is placed on costs; and the capability and costs of the on-site system, which are required when importance is attached to a low environmental load. The present tool makes it possible to easily simulate an environmental load of an on-site system virtually built on a screen, and economic effects produced by the on-site system, in a reviewing stage of system implementation. The present tool, therefore, brings about great advantages for presentation of a suitable system that is flexibly adaptable to circumstances surrounding a site and a customer.

Moreover, the present tool enables a user to visually grasp process flow of an on-site system with ease because the icons 102 (or 103) displaying a process and a machine are connected to each other through the association line 120 so as to represent the process flow. Furthermore, if the present tool is configured to adapt to a particular kind of OS so that the present tool can operate on a highly portable terminal such as a notebook personal computer, and a PDA, and a mobile phone, an on-site system can be virtually built regardless of place.

(7) Examples of Modification

The present tool has been described above by taking as the example the case where the present tool is executed on the terminal that stores the present tool in the memory 20 of the terminal. However, it can also be thought that a user terminal is installed with a browser for viewing and executing the present tool stored in another terminal (for example, a server), which is accessible over the network, through a network or wireless communications so that a user can view and execute the present tool through the network. In this case, the present tool is configured to be executable by the browser.

Figure 38:
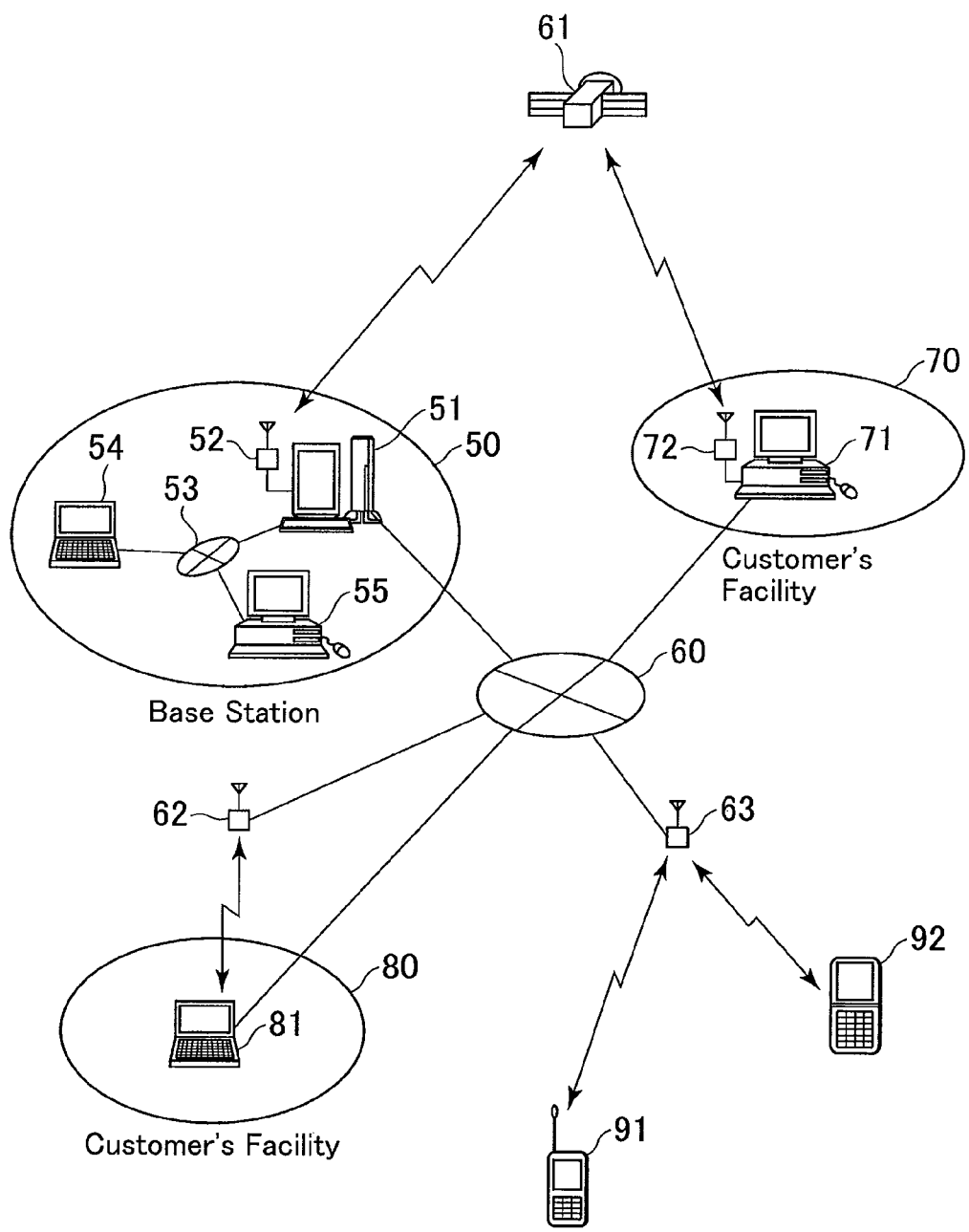
FIG. 38 is a conceptual diagram illustrating a modified example of a system in which an on-site system building support tool according to the present invention is used through a network.

FIG. 38 is a conceptual diagram illustrating a configuration of a system in which the present tool is used over a network.

In FIG. 38, the present tool is stored in a server 51 that is located in a base station 50 operated by, for example, a manufacturer and a communications company. The server 51 is connected to other terminals 54 and 55 through a LAN (Local Area Network) 53 in the base station 50.

In addition, the server 51 is connected to terminals 71 and 81 located in other facilities (for example, customer's facilities) 70 and 80 through a network (Internet) 60. As occasion requires, as shown in the figure, it is also thought that, for example, communication antennas 52 and 72 are connected to the server 51 and the terminal 71 respectively so that the server 51 can be accessed from the terminal 71 through a communication satellite 61 without using the network 60.

Additionally, for example, the terminals 81, 91, and 92 may also be configured to be capable of wireless communication with a relay antenna 62 or 63 connected to the network 60 so that the terminals 81, 91, and 92 can access the server 51. In this case, for example, base station antennas located in city areas can be used as the relay antennas. These base station antennas include base station antennas for mobile phones, base station antennas for PHS, and wireless LAN access points. Accordingly, the server 51 can be accessed from highly portable notebook PCs, PDAs, mobile phones, and the like.

Figure 39:
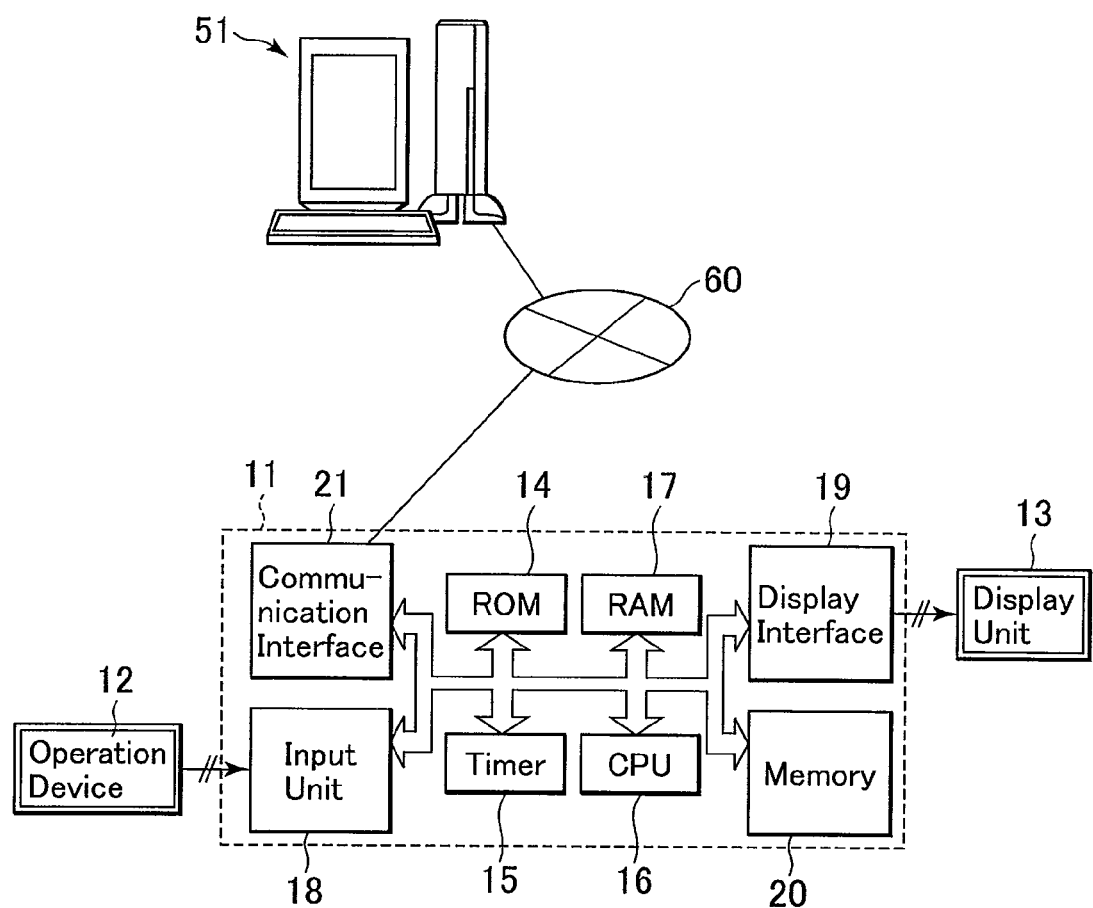
FIG. 39 is a block diagram illustrating a functional configuration of a terminal as a modified example in which the on-site system building support tool according to the present invention is used through a network.

FIG. 39 is a block diagram illustrating a functional configuration of a terminal for accessing the server 51 through a network. In this figure, similar reference numerals are used to denote parts, which are similar to those illustrated in FIG. 35, or which play roles similar to those illustrated in FIG. 35, and therefore the description thereof will be omitted.

A terminal shown in FIG. 39 is any of the terminals 54, 55, 71, 81, 91, and 92 shown in FIG. 38. A hardware configuration of the terminal shown in FIG. 39 is substantially the same as that of the terminal 10 shown in FIG. 35 except a point that the terminal shown in FIG. 39 requires a communication interface 21. FIG. 39 illustrates a case where the communication interface 21 is connected through wire to a network 60. However, if the communication interface 21 is wirelessly connected to, for example, the base station antennas 62 and 63, a wireless communication device is connected to the communication interface 21, and the communication interface 21 is then connected to the base station antennas 62 and 63 through the wireless communication device. A terminal into which a wireless communication device is built (in other words, the wireless communication device is connected to the communication interface 21 beforehand) may also be used. When the server 51 is accessed through the satellite communications 61 shown in FIG. 38, the communication antenna 72 (FIG. 38) used for satellite communications is connected to the communication interface 21 so that the server 51 can be accessed through the satellite communications 61. Configuring the system in this manner makes it possible to view and execute the present tool through the network.

(8) Others

Although the interface screens are classified into the first through fourth layers in the above description, how to classify the interface screens is not limited to the example shown in FIG. 13. The machines which have been listed as candidates in the model setting screen in the above embodiment are also merely examples. If a required system changes depending on the amount and properties of objects to be processed, machines suitable for work also change. In addition, the present tool has been described by taking as the example the case where the travel distance of the machine used is inputted into the input field 270 in each of the model setting screens 210 through 250. However, the present tool may also be so configured that if the transportation distance of wastes transported to a final disposal site is inputted, a travel distance field of the input field 270 in each of the model setting screens 210 through 250 is provided with a plurality of options of routes between a site and a disposal site, and that if a route is selected, the travel distance along the selected route is reflected on the input field 270. Further, the present tool may also be so configured that, for example, start and arrival points are specified on a map database to search for a route therebetween on the basis of the map database, and the travel distance along the route is then reflected on the input field 270.

In addition, the present tool has been described by taking as the example the case where when the flow of the on-site system is built, the association line 120 marked with an arrow is employed as a mark that indicates, in a discriminable manner, how each process corresponding to each individual icon 102 or 103 is connected to a previous or next process of each process. However, how each process is connected to the previous or next process thereof may also be shown in a different manner. For example, a simple association line, which is not marked with an arrow, may also be employed as the mark. Further, it is thought that by specifying two icons 102 or 103 showing two successive processes that are connected to each other, the following information is displayed as the mark: numbers representing the order of the processes; character strings including "to the xxx process"; and the like.

Moreover, the present tool has been described by taking as the example the case where the consumed quantity of fuel of a machine is calculated from the operating time of the machine and the fuel consumption per unit time of the machine. However, how to calculate the consumed quantity of fuel is not limited to this method. The consumed quantity of fuel may also be calculated from the processed amount of inputted objects to be processed, or from a workload based on the travel distance, and the fuel efficiency of a model of a machine to be used. When an environmental load is calculated by the present tool, it is also thought that, for example, not only $CO_2$, but also the amount of emission of other greenhouse gases, the amount of NOx emission, the amount of dioxin emission, or the amount of energy consumption is calculated. Furthermore, when costs of the on-site system are calculated, it is thought that typical costs include: costs of equipment, required for building the system; equipment maintenance expenses involved in the operation of the system; and depreciation costs. Besides them, specific costs required to meet a customer's request may also be calculated.

(9) Other Application Examples

In the above description, the waste disposal system for recycling wastes is taken as the example of the on-site system, and the present tool is applied to how to support the building of the waste disposal system. The present invention, however, can also be applied to any of the other on-site systems so long as the on-site system is a system that is built by carrying a plurality of machines to a site. Besides the waste disposal system, on-site systems to which the present tool is assumed to be applied include: a resource recycling system such as an aggregate recycling system; a soil-quality improving system; a sludge recycling system; a wood recycling system; and a soil purification system. These systems will be briefly described later.

As mentioned in the beginning, machines carried into a site include: a self-propelled machine having a function of traveling by itself by use of travelling means such as a crawler or a wheel; a travelable machine that has travelling means although the travelable machine does not have a function of traveling by itself, or that is capable of traction travelling if the travelable machine is provided with travelling means; or a transportable machine that can be transported by means of a crane, a truck, a fork lift, or the like, although the transportable machine does not have a travelling function. It is mainly assumed that the machines are mobile products that can be transported along public roads by a truck or a trailer.

The present tool supports system building by displaying, on the display unit 13, or the like, a configuration example of an on-site system that includes the plurality of machines as described above, and that handles objects to be processed in situ. The on-site system building support tool is a program for instructing computing means (for example, the CPU 16) to execute at least the steps of: displaying the icon 102 or 103 selected in the icon area 104 in the canvas area 101; selecting the plurality of icons 102 or 103, and then connecting the icons 102 or 103 to each other through the association line 120, in the canvas area 101; when the icon 102 is selected and clicked in the canvas area 101, displaying, on the display unit 13, a model setting screen to which the selected icon 102 is linked; on the basis of information of the number of machines corresponding to a model, and a workload of the machine specified on the model setting screen and about fuel consumption provided beforehand, calculating a load which the on-site system virtually built on the canvas area 101 applies to environment, and then displaying the calculation result display screen 190 on the display unit 13. In order to further improve the operability of the present tool, it is desirable that the present tool instruct the CPU 16 to execute the steps of: according to an operation signal from the operation device 12 based on GUI operation, moving, in the canvas area 101, the icon 102 or 103 that has been positioned therein; and updating a currently displayed association line, which is associated with the icon 102 or 103 moved in the canvas area 101, in response to the move of the icon 102 or 103.

(9-1) Aggregate Recycling System

Aggregate recycling systems are used to produce recycled aggregate, backfill materials, paving stones, roadbed materials, and the like, from concrete masses, rocks, ore, asphalt debris, and the like. The aggregate recycling systems are implemented into, for example, a demolition site in which concrete constructions including a building and a bridge are demolished.

In general, an aggregate recycling system is built by selectively positioning machines in situ as needed. The machines to be positioned mainly include: a excavating/loading machine (for example, a hydraulic shovel) that is used to supply other machines with concrete masses generated when a building is demolished; a crushing machine (for example, a jaw crusher, an impact crusher, and a roll crusher) for crushing a concrete mass; a recycled aggregate producer for producing recycled aggregate from concrete masses; and a screening machine (for example, a screener) for eliminating residual dross from concrete masses and recycled aggregate. Besides them, the machines to be positioned further include: a magnetic separator for eliminating magnetic foreign particles including reinforcing steel before aggregate is recycled; a conveyer for conveying concrete masses, recycled aggregate, residual dross, and the like; and a transporting machine (for example, a truck) for transporting concrete masses, recycled aggregate, residual dross, and the like.

When an aggregate recycling system is virtually built by use of the present tool, any of the icons 102 representing individual processes, each of which uses at least a excavating/loading machine, a crushing machine, a recycled aggregate producer, a screening machine, or the like, is selected in the icon area 104, and the selected icon 102 is then positioned in the canvas area 101 as needed. After that, each of the positioned icons 102 is manipulated to display a model setting screen therefor, and information including a model of a machine to be used, the number of the machines, and the operating time of the machine is then specified on the model setting screen so that the aggregate recycling system is virtually built.

(9-2) Soil-Quality Improving System

Soil-quality improving systems are widely used to improve construction soil. To be more specific, the soil-quality improving systems mix soil-quality improving materials into, for example, construction soil generated in a construction site, or the like, in the site to produce an improved soil product used for recycling. The produced improved soil product can be used as backfill materials for a tunnel, embankment materials, levee materials, foundation ground materials, mixed materials mixed with crusher-run stones, backfill materials, special fertilizer, and the like. In addition, the soil-quality improving systems are useful not only for the construction soil improvement but also for, for example, generation of improved soil, and stabilization of a subsurface layer. In the case of the improved soil generation, earth and sand obtained by excavating an outer layer of a residential construction site is improved on the spot to generate improved soil, and the improved soil is then used to backfill the outer layer so that the foundation is strengthened. In the case of the subsurface layer stabilization, the earth and sand obtained by excavating a specified area in a site (for example, a road construction site) is improved on the spot to generate improved soil, and the improved soil is then used as subgrade materials.

In general, a soil-quality improving system is usually built by positioning machines in situ as needed. The machines to be positioned mainly include a soil-quality improving machine for mixing soil-quality improving materials into earth and sand that are objects to be processed. Additionally, the machines to be positioned further include: a feeding machine (for example, a hydraulic shovel, or a conveyer) for supplying the soil-quality improving machine with the earth and sand; and a sorting machine for sorting, by particle size, the earth and sand supplied to the soil-quality improving machine, or the improved soil output from the soil-quality improving machine.

When a soil-quality improving system is virtually built by use of the present tool, any of the icons 102 representing individual processes, each of which uses at least a soil-quality improving machine, a feeding machine, a sorting machine, or the like, is selected in the icon area 104, and the selected icon 102 is then positioned in the canvas area 101 as needed. After that, each of the positioned icons 102 is manipulated to display a model setting screen therefor, and information including a model of a machine to be used, the number of the machines, and the operating time of the machine is then specified on the model setting screen so that the soil-quality improving system is virtually built.

(9-3) Sludge Recycling System

A sludge recycling system is a system for recycling sludge including: construction sludge generated when, for example, a tunnel is excavated; and dredging sludge generated at the time of dredging work. It is assumed that improved soil generated by the sludge recycling system is used for backfill of a building, embankment of a road (subgrade), backfill of a structure, embankment for a road base, a river levee, and land formation.

In general, a sludge recycling system is usually built by positioning machines in situ as needed. The machines to be positioned mainly include a sludge recycling machine for adding/mixing a lime-based or cement-based solidification material or a high-molecular improving material to/with sludge that are objects to be processed, so that the quality of the sludge is improved. Moreover, the machines to be positioned further include: a feeding machine (for example, a hydraulic shovel and a conveyer) for supplying the sludge recycling machine with sludge; and a sorting machine for eliminating foreign particles including gravel and impurities from the sludge supplied to the sludge recycling machine, or from improved soil output from the sludge recycling machine. There are various kinds of sludge recycling machines including: a sludge recycling machine equipped with a paddle mixer, which is widely used as a soil-quality improving machine; and a sludge recycling machine equipped with a rotary drum. These different kinds of sludge recycling machines are properly used depending on the circumstances.

When a sludge recycling system is virtually built by use of the present tool, any of the icons 102 representing individual processes, each of which uses at least a sludge recycling machine, a feeding machine, a sorting machine, or the like, is selected in the icon area 104, and the selected icon 102 is then positioned in the canvas area 101 as needed. After that, each of the positioned icons 102 is manipulated to display a model setting screen therefor, and information including a model of a machine to be used, the number of the machines, and the operating time of the machine is then specified on the model setting screen so that the sludge recycling system is virtually built.

(9-4) Wood Recycling System

A wood recycling system is a system for recycling, as wood chips, wood including: waste wood generated in, for example, a demolition site; thinned wood from the forest; branches and leaves; and pulled stumps. The generated wood chips are used as: combustion fuel used for, for example, an energy source; fertilizer made by composting the wood chips; spreading materials for domestic animals; and a raw material of a board, which is used as a construction material.

In general, a wood recycling system is usually built by positioning machines in situ as needed. The machines to be positioned mainly include a wood crusher for crushing wood to be crushed, which is an object to be processed, so as to produce wood chips. In addition, the machines to be positioned further include: a feeding machine (for example, a hydraulic shovel, and a conveyer) for supplying the wood crusher with the wood to be crushed; and a sorting machine for sorting, by particle size, wood chips output from the wood crusher. When fertilizer is produced, a soil-quality improving machine for mixing at least soil with wood chips to produce potting compost may also be positioned.

When a wood recycling system is virtually built by use of the present tool, any of the icons 102 representing individual processes, each of which uses at least a wood crusher, a feeding machine, a sorting machine, or the like, is selected in the icon area 104, and the selected icon 102 is then positioned in the canvas area 101 as needed. After that, each of the positioned icons 102 is manipulated to display a model setting screen therefor, and information including a model of a machine to be used, the number of the machines, and the operating time of the machine is then specified on the model setting screen so that the wood recycling system is virtually built.

(9-5) Soil Purification System

A soil purification system is a system for purifying contaminated soil polluted with pollutants. The contaminated soil is left in, for example, a land where there used to be any of various facilities including a factory and a gas station. How to process contaminated soil differs depending on a kind of a pollutant. If an object to be processed is contaminated soil containing a heavy-metal-based pollutant such as hexavalent chromium, arsenic, and lead, for example, insolubilizer is mixed into the contaminated soil so that the pollutant contained in the contaminated soil is insolubilized. Taking the hexavalent chromium as an example, for example, ferrous sulfate is used as the insolubilizer to reduce the hexavalent chromium to trivalent chrome, which causes the solubility to decrease. A solidification material is then mixed with the trivalent chrome to achieve solidification (insolubilization). If an object to be processed is contaminated soil containing a volatile organic compound (what is called, VOC such as trichloroethylene, and tetrachloroethylene) or oil content as a pollutant, a lime-based soil-quality improving material is mixed into the contaminated soil. As a result of the mixture, part of the pollutant is volatilized by hydration reaction heat with the nonvolatile part of the pollutant coated with the soil-quality improving material, and consequently, the pollutant is insolubilized (confined). In addition, in the case of contaminated soil containing oil content as a pollutant, there is also a method in which soil containing a large number of microbes is mixed into the contaminated soil so that the microbes decompose the pollutant. Moreover, there is also a method in which flow of ground water is investigated, and a wall of soil containing a large number of microbes is then made in such a manner that the wall crosses the flow of ground water in the ground on the downstream side, thereby preventing the pollutant from moving further to the downstream side.

In general, a soil purification system is usually built by positioning machines in situ as needed. The machines to be positioned mainly include a soil-quality improving machine for mixing add-in materials (for example, a medicine, a solidification material, and soil containing microbes) into contaminated soil that is an object to be processed. In addition, the machines to be positioned further include: a feeding machine (for example, a hydraulic shovel, and a conveyer) for supplying the soil-quality improving machine with contaminated soil; and a sorting machine for eliminating foreign particles from contaminated soil to be supplied to the soil-quality improving machine, or from improved soil output from the soil-quality improving machine. In addition, there is also a case where a replenishing machine (for example, a shovel, a crane, or a silo) for replenishing the soil-quality improving machine with an add-in material is positioned so as to improve the efficiency of processing. Moreover, there is also a case where a crushing machine, or a shredder, for crushing contaminated soil beforehand is positioned so as to improve the mixability of contaminated soil. Further, if VOC and oil content are volatilized by hydration reaction heat, a pump for sucking volatile part, a tent for covering the whole system if necessary, and the like, may also be prepared.

When a soil purification system is virtually built by use of the present tool, any of the icons 102 representing individual processes, each of which uses at least a soil-quality improving machine, a feeding machine, a sorting machine, or the like, is selected in the icon area 104, and the selected icon 102 is then positioned in the canvas area 101 as needed. After that, each of the positioned icons 102 is manipulated to display a model setting screen therefor, and information including a model of a machine to be used, the number of the machines, and the operating time of the machine is then specified on the model setting screen so that the soil purification system is virtually built.

The invention claimed is:

1. An on-site system building support tool for building an on-site system on a screen of a display unit to simulate the on-site system, the on-site system including a plurality of machines, each of which is self-propelled, travelable, or transportable, and the on-site system processing an object to be processed in situ where the object to be processed has been produced,
   wherein computing means performs the steps of:
   displaying a layout creation screen on the display unit, the layout creation screen including:
      an icon area for displaying a plurality of icons, each of which represents, in a discriminable manner, any of various kinds of machines that can be used in the on-site system, or any of processes to be performed in the on-site system; and
      a canvas area in which the on-site system is virtually built;
   displaying, in the canvas area, an icon selected in the icon area according to an operation signal from an operation device based on GUI operation;
   after the plurality of icons are positioned in the canvas area, displaying, in the canvas area, a mark indicating, in a discriminable manner, how each process which is associated with the plurality of icons selected in the canvas area is connected to a previous or next process of each process;
   when an icon is selected and clicked in the canvas area, displaying, on the display unit, a model setting screen used to specify a model of a machine to be used in a process associated with the selected icon, and to specify the number of the machines, and a workload of the machine; and
   on the basis of information about the number of machines corresponding to the model and the workload of the machine specified on the model setting screen and about fuel consumption provided beforehand, calculating a load which the on-site system virtually built on the canvas area applies to environment, and then displaying the result of the calculation on the display unit;
      wherein: a particular icon representing a machine or a process, which involves branching of flow of a processed object, has a plurality of ratio setting objects, each of which is used to specify a sorting ratio of the processed object;
      the sorting ratios of the processed objects displayed in the plurality of sorting ratio objects are always 100% in total; and
      when a sorting ratio displayed in any of the ratio setting objects is changed, sorting ratios displayed in the other ratio setting objects are also changed accordingly.

2. The on-site system building support tool according to claim 1,
   wherein: the computing means performs the step of, according to an operation signal from the operation device based on GUI operation, moving, in the canvas area, an icon positioned in the canvas area.

3. The on-site system building support tool according to claim 2,
   wherein: the computing means performs the step of updating the currently displayed mark, which is associated with the icon moved in the canvas area, in response to the move of the icon.

4. The on-site system building support tool according to claim 1,
   wherein: the mark is an association line that indicates, with an arrow, how each process which is associated with the plurality of icons selected in the canvas area is connected to a previous or next process of each process.

5. The on-site system building support tool according to claim 1,
wherein: the GUI operation is drag-and-drop operation or copy-and-paste operation.

6. The on-site system building support tool according to claim 1,
wherein: the load applied to environment is the amount of $CO_2$ emission calculated on the basis of the consumed quantity of fuel of each model specified on the model setting screen.

7. The on-site system building support tool according to claim 1,
wherein: the model setting screen has an object used for displaying a machine-body information screen on which reference information about a model of a machine to be used can be viewed.

8. The on-site system building support tool according to claim 1,
wherein: the icon area includes the icon that is associated with a sorting machine for sorting processed objects; the icon that is associated with a feeding machine for supplying the sorting machine with an object to be processed; and the icon that is associated with a transporting machine for transporting an object to be processed or a processed object.

9. The on-site system building support tool according to claim 2,
wherein: the GUI operation is drag-and-drop operation or copy-and-paste operation.

* * * * *